United States Patent
Paglieroni et al.

(10) Patent No.: US 12,124,279 B2
(45) Date of Patent: Oct. 22, 2024

(54) SWARM PATH PLANNER SYSTEM FOR VEHICLES

(71) Applicant: Lawrence Livermore National Security, LLC, Livermore, CA (US)

(72) Inventors: David W. Paglieroni, Pleasanton, CA (US); N. Reginald Beer, Pleasanton, CA (US); David Chambers, Livermore, CA (US)

(73) Assignee: LAWRENCE LIVERMORE NATIONAL SECURITY, LLC, Livermore, CA (US)

(*) Notice: Subject to any disclaimer, the term of this patent is extended or adjusted under 35 U.S.C. 154(b) by 909 days.

(21) Appl. No.: 16/603,816

(22) PCT Filed: Apr. 12, 2017

(86) PCT No.: PCT/US2017/027253
§ 371 (c)(1),
(2) Date: Oct. 8, 2019

(87) PCT Pub. No.: WO2018/190833
PCT Pub. Date: Oct. 18, 2018

(65) Prior Publication Data
US 2020/0117220 A1   Apr. 16, 2020

(51) Int. Cl.
*G05D 1/10* (2006.01)
*B64C 39/02* (2023.01)
(Continued)

(52) U.S. Cl.
CPC ......... *G05D 1/104* (2013.01); *G01C 21/3446* (2013.01); *G01C 21/3453* (2013.01);
(Continued)

(58) Field of Classification Search
CPC .... G05D 1/104; G05D 1/1064; G05D 1/0027; B64C 39/024; B64C 2201/143;
(Continued)

(56) References Cited

U.S. PATENT DOCUMENTS 5,006,988 A * 4/1991 Borenstein ........... G05D 1/0255
701/25
6,134,502 A * 10/2000 Sarangapani ........ G05D 1/0217
701/120

(Continued)

FOREIGN PATENT DOCUMENTS

WO   2018009189 A1   1/2018
WO   2018190833 A1   10/2018
WO   2018190834 A1   10/2018

OTHER PUBLICATIONS

Xu, Shengdong et al. "Real Time 3D Navigation for Autonomous Vision-Guided MAVs," IEEE/RSJ 978-1-4799-9994-1/15, 2015, Hamburg, Germany (Year: 2015).*

(Continued)

*Primary Examiner* — Russell Frejd
*Assistant Examiner* — Ana D Thomas
(74) *Attorney, Agent, or Firm* — Perkins Coie LLP

(57) ABSTRACT

A system for determining optimal paths without collision through a travel volume for a swarm of vehicles is disclosed. The system determines a travel path for the swarm leader vehicle using a minimal cost path derived from various measures of environmental cost for avoiding objects in traveling from leader location to target location. The system also determines, for each empty neighbor location of each follower vehicle, relational costs for follower vehicle travel relative to leader vehicle travel. The various measures of relational cost seek to maintain a prescribed positional relationship between each follower vehicle and the leader vehicle given the leader vehicle travel path. Based on
(Continued)

various measures of environmental and relational cost, the system determines the best travel path for the each follower vehicle relative to the leader vehicle.

32 Claims, 13 Drawing Sheets

(51) Int. Cl.
| | |
|---|---|
| G01C 21/34 | (2006.01) |
| G05D 1/00 | (2024.01) |
| G06Q 10/047 | (2023.01) |
| G08G 5/00 | (2006.01) |
| G06Q 10/04 | (2023.01) |

(52) U.S. Cl.
CPC ......... G05D 1/0027 (2013.01); G05D 1/1064 (2019.05); G06Q 10/047 (2013.01); G08G 5/0021 (2013.01); B64U 2201/10 (2023.01); B64U 2201/102 (2023.01)

(58) Field of Classification Search
CPC ............ G01C 21/3446; G01C 21/3453; G06Q 10/047; G08G 5/0021; G08G 5/0013; G08G 5/0039; G08G 5/0052; G08G 5/0069; G08G 5/0078; G08G 5/045
See application file for complete search history.

(56) References Cited

U.S. PATENT DOCUMENTS

| | | | | |
|---|---|---|---|---|
| 2005/0216181 | A1* | 9/2005 | Estkowski | G08G 1/166 340/995.23 |
| 2006/0293792 | A1* | 12/2006 | Hasegawa | G05D 1/0261 700/245 |
| 2007/0043502 | A1 | 2/2007 | Mudalige et al. | |
| 2007/0043506 | A1 | 2/2007 | Mudalige et al. | |
| 2013/0116880 | A1* | 5/2013 | Shitamoto | G05D 1/0223 701/25 |
| 2014/0200807 | A1* | 7/2014 | Geisberger | G06N 5/01 701/533 |
| 2017/0235316 | A1* | 8/2017 | Shattil | B64C 39/024 701/3 |
| 2018/0074520 | A1* | 3/2018 | Liu | B64C 39/024 |

OTHER PUBLICATIONS

Yan et al. "Path Planning in Complex 3D Environment Using a Probabilistic Roadmap Method," International Journal of Automation and Computing, 10(6), Dec. 2013, 525-533 (Year: 2013).*
Chi, Tieng et al. "A Strategy of Multi-robot Formation and Obstacle Avoidance in Unknown Environment," Proceedings of the IEEE, China, Aug. 2016 (Year: 2016).*
Barnes et al. "Swarm formation control utilizing elliptical surfaces and limiting functions." IEEE Transactions on Systems, Man, and Cybernetics, Part B (Cybernetics) 39.6 (2009): 1434-1445. (Year: 2009).*
Hung, Shao-Ming, and Sidney N. Givigi. "A Q-learning approach to flocking with UAVs in a stochastic environment." IEEE transactions on cybernetics 47.1 (2016): 186-197. (Year: 2016).*
Lamont, Gary B., James N. Slear, and Kenneth Melendez. "UAV swarm mission planning and routing using multi-objective evolutionary algorithms." 2007 IEEE Symposium on Computational Intelligence in Multi-Criteria Decision-Making. IEEE, 2007. (Year: 2007).*
Samaniego, Franklin, et al. "UAV motion planning and obstacle avoidance based on adaptive 3D cell decomposition: Continuous space vs discrete space." 2017 IEEE Second Ecuador Technical Chapters Meeting (ETCM). IEEE, 2017. (Year: 2017).*
Shaferman, Vitaly, and Tal Shima. "Unmanned aerial vehicles cooperative tracking of moving ground target in urban environments." Journal of guidance, control, and dynamics 31.5 (2008): 1360-1371. (Year: 2008).*
Yan, Fei, Yan Zhuang, and Jizhong Xiao. "3D PRM based real-time path planning for UAV in complex environment." 2012 IEEE international conference on robotics and biomimetics (Robio). IEEE, 2012. (Year: 2012).*
Newaz, Abdullah Al Redwan, et al. "3D exploration priority based flocking of UAVs." 2013 IEEE International Conference on Mechatronics and Automation. IEEE, 2013. (Year: 2013).*
Rathbun, David, et al. "An evolution based path planning algorithm for autonomous motion of a UAV through uncertain environments." Proceedings. The 21st digital avionics systems conference. vol. 2. IEEE, 2002. (Year: 2002).*
Yan, Fei, Yi-Sha Liu, and Ji-Zhong Xiao. "Path planning in complex 3D environments using a probabilistic roadmap method." International Journal of Automation and computing 10 (2013): 525-533. (Year: 2013).*
Ahuja et al., "Faster Algorithms for the Shortest Path Problem", Journal Assoc. Comput. Mach., vol. 37, No. 2, Apr. 1990, pp. 213-223.
Chambers, H., D., "Estimation of time-of-arrivals and contacts," 12 pages.
Chambers, H., D., "Gradient Descent Navigation Method for Collision Avoidance," 9 pages.
Chi, Tieng et al. "A Strategy of Multi-robot Formation and Obstacle Avoidance in Unknown Environment," Proceedings of the IEEE, China, Aug. 2016.
Dijkstra "A Note on Two Problems in Connexion with Graphs", Numerische Mathematik, vol. 1, 1959, pp. 269-271.
Freedman, et al., "Fibonacci Heaps and their Uses in Improved Network Optimization Algorithms", Journal Assoc. Comput. Mach., vol. 34, No. 3, Jul. 1987, pp. 596-615.
Gageik, et al., "Obstacle Detection and Collision Avoidance for a UAV With Complementary Low-Cost Sensors," IEEE Access, vol. 3, Jun. 2015.
Goerzen, et al., "A Survey of Motion Planning Algorithms from the Perspective of Autonomous UAV Guidance," © Springer Science + Business Media B.V. 2009.
Hart, et al., "A Formal Basis for the Heuristic Determination of Minimum Cost Paths," IEEE, vol. ssc-4, No. 2, Jul. 1968.
Hrabar, "Reactive Obstacle Avoidance for Rotorcraft UAVs, "2011 IEEE/RSJ International Conference on Intelligent Robots and Systems Sep. 25-30, 2011. San Francisco, CA, USA.
International Search Report and Written Opinion of Paglieroni et al., issued in International Application No. PCT/US17/27260, Dec. 22, 2017, 20 pages.
International Search Report and Written Opinion, received in Application No. PCT/US17/27253, mailed Feb. 2, 2018, 27 pages.
Kendoul, et al., "Survey of Advances in Guidance, Navigation, and Control of Unmanned Rotorcraft Systems," Journal of Field Robotics 29(2), 315-378 (2012).
Khatib, "The potential filed approach and operational space formulation in robot control," Proc. Fourth Yale Workshop on Applications of Adaptive Systems Theory Yale University, May 1985.
Luque-Vega, et al., "Distributed Control for Multiple Quadrotors with Obstacle Avoidance Using Potential Fields, "WAC 2016 1570244885.
Martin, et al., "Robot Evidence Grids,"The Robotics Institute Carnegie Mellon University Pittsburgh, Mar. 1996.
Masoud, "Kinodynamic Motion Planning," IEEE Robotics & Automation Magazine, Mar. 2010.
Maurer, et al., "A Linear Time Algorithm for Computing Exact Euclidean Distance Transforms of Binary Images in Arbitrary Dimensions," IEEE, vol. 25, No. 2, Feb. 2003.
Paglieroni, "A Unified Distance Transform Algorithm and Architecture", Machine Vision and Applications, vol. 5, 1992, pp. 47-55.
Paglieroni, "Matching Random Tree Models of Spatio-Temporal Patterns to Tables or Graphs", Proc. IEEE Conf. Computational Intelligence and Data Mining (CIDM), Honolulu, HI, Apr. 1-5, 2007, pp. 560-567.

(56) References Cited

OTHER PUBLICATIONS

Paul et al. "UAV Formation Flight using 3D potential Filed," Department of Engineering Cybernetics, Norway, 2008.
Rizqi et al. "Path Planning and Formation Control via Potential Function for UAV Quadrotor," ARIS 2014, Taipei, Taiwan.
Rosenfeld, et al., "Sequential Operations in Digital Picture Processing," Journal of the Association for Computing Machinery, vol. 13, No. 4, 1966, pp. 471-494.
Scherer, et al., "Flying Fast and Low Among Obstacles: Methodology and Experiments," The International Journal of Robotics Research vol. 27, No. 5, May 2008, pp. 549-574.
Sfeir, J., et al., "An Improved Artificial Potential Field Approach to Real-Time Mobile Robot Path Planning in an Unknown Environment", 978-1-4577-0820, IEEE, Jul. 2011.
Xu, Shengdong et al. "Real Time 3D Navigation for Autonomous Vision-Guided MAVs," IEE/RSJ 978-1-4799-9994-1/15, 2015, Hamburg, Germany.
Yan et al. "Path Planning in Complex 3D Environment Using a Probabilistic Roadmap Method," International Journal of Automation and Computing, 10(6), Dec. 2013, 525-533.
Zelek, "Dynamic Path Planning," Centre for Intelligent Machines & Dept. of Electrical Engineering McGill University, Montreal, Quebec, Canada, H3A 2A7.

* cited by examiner

SWARM PATH PLANNER SYSTEM FOR VEHICLES

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Unmanned aerial vehicles ("UAVs"), also referred to as unmanned aircraft systems ("UAS") or drones, are employed for a wide variety of applications such as military, scientific, commercial, humanitarian, and recreational applications. UAVs can be controlled in various ways that range from autonomous control by a navigation system to remote control by an operator. With semiautonomous control, an operator can remotely control a UAV to override an autonomous control. Navigation (or guidance) systems that provide autonomous control may be on board the UAVs or at ground stations that receive data from the UAVs and transmit instructions to the UAVs. A navigation system may simply navigate the UAV to a destination location along a specified route (e.g., a straight line) defined by Global Positioning System ("GPS") coordinates. More sophisticated navigation systems may interface with an onboard imaging system that collects images of the environment near the UAV. The navigation system may process the images to identify obstacles in the way of the UAV (e.g., buildings, mountains, and trees) and direct the UAV on a route to avoid the obstacles. When a UAV is under remote control of an operator, the UAV may have an onboard camera system that streams images of the environment to the operator. If the UAV does not have an onboard camera system, the operator needs to have a line of sight to the UAV. The operator may use various cockpit-type controls to guide the UAV.

DETAILED DESCRIPTION

Figure 1:
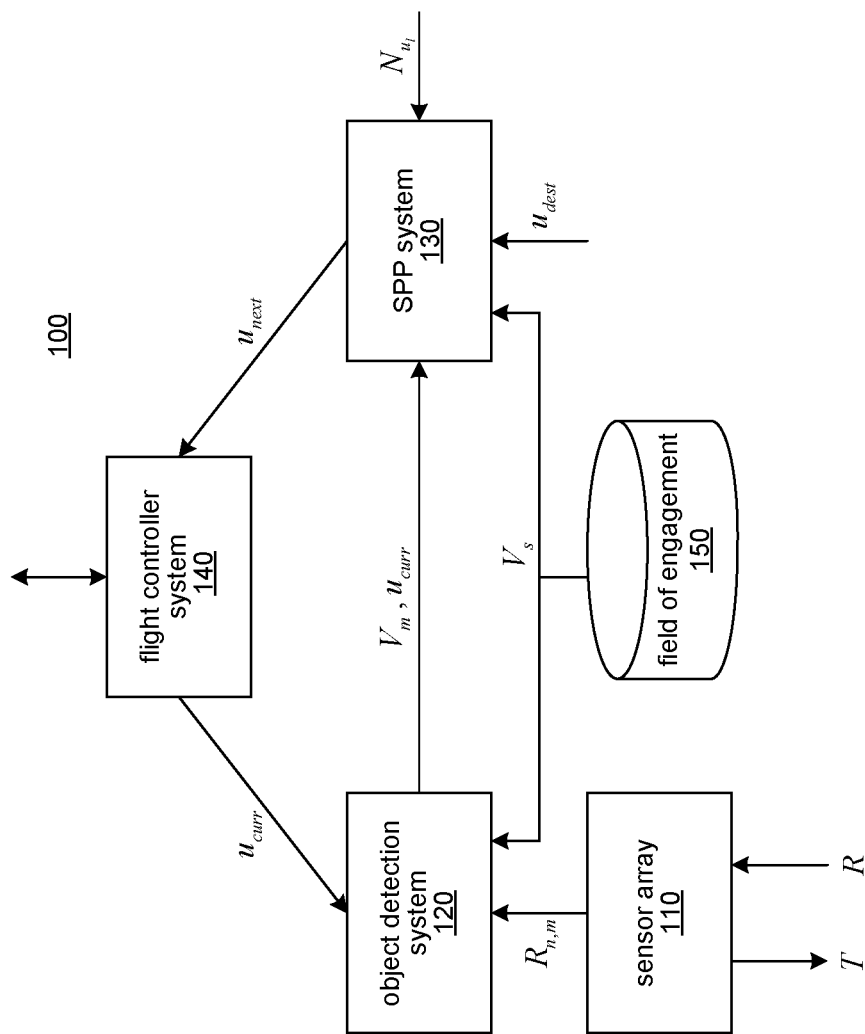
FIG. 1 is a block diagram illustrating components of an OSA system that employs the SPP system in some embodiments.

A method and system for autonomous control of a swarm of vehicles to travel to a target while avoiding objects (i.e., obstacles) is provided. In some embodiments, a swarm path planner ("SPP") system determines at intervals a leader travel direction for a leader vehicle (e.g., UAV) of a swarm to travel from a leader location of the leader vehicle to a target or destination location. For each follower vehicle of the swarm, the SPP system also determines at intervals a follower travel direction to follow the leader vehicle while maintaining a positional relationship with the leader vehicle and avoiding objects. The SPP system may use a variety of environmental travel direction techniques to determine a leader travel direction of the leader vehicle to avoid objects, such as those described in PCT Patent Application No. PCT/US16/41208, entitled "Object Sense and Avoidance System For Autonomous Vehicles" and filed on Jul. 6, 2016, which is hereby incorporated by reference; a "determine leader travel direction" component or system as described in the following; and so on. To determine a follower travel direction of a follower vehicle, the SPP system may use a combination of the environmental travel direction technique used to determine the leader travel direction and a relational travel direction technique. The use of the environmental travel direction technique helps ensure that a follower vehicle avoids obstacles, and the relational travel direction technique helps ensure that the follower vehicle maintains a positional relationship with the leader vehicle. The environmental travel direction technique uses environmental measures (e.g., distance from a vehicle to the nearest object or obstacle that is to be avoided) to determine a travel direction. The relational travel direction technique uses relational measures (e.g., distance to leader vehicle) to measure the positional relationship between the leader travel direction and possible follower travel directions for a follower vehicle. The SPP system may employ a probability function that suggests relational preference for travel direction and outputs a quantitative indication that a follower travel direction will maintain a desired positional relationship between the leader vehicle and the follower vehicle. The probability function is based on a desired formation of the swarm. The use of both environmental and relational travel direction techniques helps ensure that a swarm of vehicles travel along the shortest possible travel path to a target location while maintaining a desired formation of the swarm.

In some embodiments, the SPP system may be part of an object sense and avoid ("OSA") system. The OSA system, which may be onboard each vehicle of the swarm, may include an object detection system, the SPP system, and a flight controller system. The OSA system may also include a sensor array that interfaces with the object detection system. The OSA system repeatedly uses the sensor array to collect sensor data of any objects in an object field around the vehicle. For example, the sensor array may transmit radar signals and receive the return signals that are reflected by the objects. The object detection system then detects the objects and determines their locations based on the sensor data. For example, the object detection system may triangulate the location of an object based on return signals received by multiple sensors. The SPP system then plans a next travel direction for the vehicle to avoid the detected objects while seeking to minimize the traversal cost (e.g., distance traveled). If a vehicle is a follower vehicle, the SPP system determines the next leader travel direction and factors that into determining the next follower travel direction for a follower vehicle. The OSA system then instructs the vehicle to travel in the travel direction until the process is repeated and a new travel direction is planned that takes into consideration the objects that are currently in the object field.

In some embodiments, the SPP system considers the space through which the swarm can travel to the target location to be a travel or transit volume that is divided into sub-volumes that are also referred to voxels, which may be cubes. Each voxel has 26 neighbor voxels that include six face neighbor voxels adjacent to its faces, 12 edge neighbor voxels adjacent to its edges, and eight corner neighbor voxels adjacent to its corners. The distance from a voxel to a side neighbor voxel is 1 voxel distance, to an edge neighbor voxel is $\sqrt{2}$ voxel distances, and to a corner neighbor voxel is $\sqrt{3}$ voxel distances, where a voxel distance is the distance between the centers of a voxel and a face neighbor voxel. A voxel that contains an object is referred to as an object voxel, and a voxel that does not contain an object is referred to as a non-object or empty voxel. The leader location is in a leader voxel, the follower locations are in follower voxels, and the target location is in a target voxel.

To determine travel paths for a swarm, the SPP system generates an environmental measure for each pair of empty neighbor voxels. For example, an environmental measure for a pair of voxels may be a distance measure indicating distance (e.g., in voxels) to a nearest object voxel and an object density measure indicating density of object voxels. The SPP determines, based on the environmental measures, a leader travel path for the leader vehicle of the swarm to travel from the leader voxel to the target voxel. For each pair of a follower voxel and an empty neighbor voxel, the SPP system calculates a relational measure for the pair. For example, a relational measure for a follower voxel and an empty neighbor voxel may be a distance separation measure and an elevation angle separation measure between the empty neighbor voxel and the next leader voxel. The SPP system then determines a follower travel path for the follower vehicle to follow the lead vehicle based on the environmental measures and the relational measures.

In some embodiments, the SPP system may represent the travel volume as a cost graph where vertices represent empty voxels, edges connect vertices of empty neighbor voxels, and costs are assigned to each edge. An environmental cost of an edge connecting a pair of an empty voxel and an empty neighbor voxel is based on the environmental measures for the pair. A relational cost for an edge connecting a pair of a follower voxel and an empty neighbor voxel is based on the relational measure for the pair. The cost for an edge that has a relational cost may be the maximum of the relational cost and the environmental cost for the edge. To determine the travel path for a vehicle, the SPP applies a minimal cost path algorithm to the cost graph to determine the minimal cost path from a leader vehicle voxel (i.e., the voxel that contains the vehicle) to the target voxel. The SPP system uses the minimal cost path as the travel path. The SPP system selects the travel direction for a vehicle as the direction of the neighbor voxel of the vehicle voxel that is on the travel path.

Although the OSA system that employs the SPP system is described primarily in the context of a vehicle that is a UAV, the OSA system may be used to control a variety of autonomous vehicles ("AVs") that are autonomously driven. The AVs may include UAVs, unmanned ground vehicles ("UGVs"), unmanned underwater vehicles ("UUVs"), and unmanned space vehicles ("USVs"). These vehicles are "unmanned" in the sense that a person does not control the guidance of the vehicle, irrespective of whether a person is actually on board the vehicle. For example, a UGV may transport several people with the UGV's guidance under the sole control of the OSA system (i.e., autonomously). For UGVs, the transit volume may need to be only slightly higher than the vehicle and may be effectively considered to be a plane or volume with a height of one in the z-direction (vertical). If the UGV is, for example, operating in a parking structure, the transit volume may be represented by a stack of planes-one for each level of the parking structure. For UUVs, the sensor array may be sonar-based, but the OSA system would operate in a manner similar to that for UAVs. For USVs, the OSA system may be particularly useful in helping a satellite avoid collisions with space debris or other satellites. The OSA system for USVs may employ a larger transit volume to encompass a wider approach of objects. In addition, the OSA system may be augmented with the estimated locations of known space objects determined from orbital parameters (e.g., Keplerian elements) of the space objects to help in determining whether return signals correspond to an object. In some embodiments, the OSA system may not even employ a sensor array but rather may rely solely on the estimated locations of the known space objects such as those estimated from the orbital parameters, retrieved from a geographic information system of objects (e.g., buildings, power lines, and trees), determined on prior traversals of the travel volume, and so on. Also, although the OSA system is described primarily based on a transit volume that is in front of the UV, the transit volume may surround the UV. In such a case, the UV may include multiple sensor arrays to sense the entire area around the vehicle. Such a surrounding transit volume may be useful, for example, to sense and avoid objects (e.g., space debris) that are traveling towards the UV from the rear.

FIG. 1 is a block diagram illustrating components of an OSA system that employs the SPP system in some embodiments. The OSA system 100 includes a sensor array 110, an object detection system 120, an SPP system 130, a flight controller system 140, and a field-of-engagement store 150. The sensor array transmits transmit signals T and receives return signals R. The sensor array provides the return signals $R_{n,m}$ corresponding to time n for receiver m. The object detection system is also provided with the current UV location relative to a fixed coordinate system as collected by the flight controller that is converted to a current voxel $u_{curr}$. The object detection system provides to the SPP system the current voxel of the vehicle and the object voxel of each detected object V for time n. The SPP system may also access the field-of-engagement store to retrieve the object voxels of known stationary objects $V_s$. The SPP system is also provided with the target voxel $u_{dest}$. For example, the target voxel may be 10 meters above a moving vehicle that the vehicle is to track. In such a case, the target voxel may be calculated based on the current location of the vehicle as reported by a location system (e.g., GPS system) on board the vehicle. If the vehicle is a follower vehicle, the SPP may also be provided with the next leader voxel $Nu_l$. Alternatively, the SPP system of a follower vehicle may calculate the next leader voxel assuming that the object detection system is aware of the same objects that the leader vehicle uses in determining its travel direction. The SPP system calculates the travel direction and then provides the travel direction to the flight controller system, for example, as a next vehicle voxel $u_{next}$. The flight controller system directs the vehicle to travel in the travel direction. The object detection system, the SPP system, and the flight controller system repeat their processing at intervals to determine the next travel direction given the objects currently in the travel volume.

In some embodiments, the object detection system and the SPP system are implemented in software that is executed by an onboard processor of a UAV. The processor may send instructions via a Micro Air Vehicle Communication Protocol ("MAVLink") to an autopilot system of the UAV. The processor and the autopilot system may be connected via a Universal Asynchronous Receiver/Transmitter ("UART") connection. Suitable processors may include, for example, Odroid C1+, Odroid XU4, Raspberry Pi, Intel Edison, Intel NUC, Gigabyte Brix, and NVIDIA Jetson TK1. In some embodiments, aspects of the OSA system may be executed by a processor that is not on board. In such an embodiment, an onboard processor may include a WiFi interface to receive data from and transmit data to a ground station processor. If the SPP system is executed by the ground station processor, then the onboard processor transmits the object voxels identified by the objection detection system to the ground station processor and receives the travel directions and possibly the target voxel from the ground station processor. The onboard processor and the ground station processor may communicate via an Intel WiFi Link 5000 adapter.

Autonomous Control of Isolated UVs

In some embodiments, the SPP system categorizes objects as stationary or moving. For example, a building is a stationary object, and another UV that is traveling is a moving object. A field-of-perception is a localized volume of the environment sensed by the UV at a given instant of time, which may include stationary and moving objects. A field-of-engagement is a much larger volume of the environment, which may include only stationary objects. While a field-of-engagement can cover a much larger volume than a field-of-perception, the representation is static (because moving objects are not included), and the accuracy of the stationary objects may be subject to statistical uncertainty.

In some embodiments, field-of-perception and field-of-engagement are 3D binary arrays of $N_V$ voxels (cubes of width A meters in the travel volume). Empty voxels are represented by a value of zero, and object voxels are represented by a value of one. A field-of-engagement can, for example, may be generated from a high resolution digital surface model ("DSM"), which is a 2D array of surface heights versus xy location on a horizontal plane with, for example, one meter xy grid spacing or better. The SPP system represents an object in the travel volume by fusing an instantaneous field-of-perception with a static field-of-engagement. As described above, the travel volume is represented by a 3D binary array of voxels. The travel volume is represented as a cost graph whose vertices each correspond to a different empty voxel and whose edges each point from some empty voxel to another empty voxel in its 3×3×3 neighborhood. The number of edges in a cost graph is $N_E < 26 N_V$. For a field-of-engagement, the target voxel may correspond to one vertex (namely, a target vertex). However, for a field-of-perception, if the target lies outside, the SPP system may represent the empty voxel on the line of sight from the vehicle to the target that is closest to the target as the target vertex.

Since there are multiple paths of edges from a vehicle vertex to a target vertex, the SPP system determines the optimal path. To determine the optimal path, the SPP system assigns a cost to each edge of the cost graph. The SPP system may use one of a variety of minimal cost path algorithms to determine the optimal path. For example, the minimal cost paths from the target vertex to all of the remaining vertices can be computed using Dijkstra's algorithm in $O(N_V^2)$ time. (See E. W. Dijkstra, "A Note on Two Problems in Connexion with Graphs," Numerische Mathematik, Vol. 1, 1959, pp. 269-271, which is hereby incorporated by reference.) The SPP system can reduce the time to $O[N_E + N_V \log_2 N_V < (26 + \log_2 N_V) N_V]$ using a Fibonacci heap. (See Ravindra K. Ahuja, Kurt Mehlhorn, James B. Orlin, and Robert E. Tarjan, "Faster Algorithms for the Shortest Path Problem," Journal Assoc. Comput. Mach., Vol. 37, No. 2, April 1990, pp. 213-223, which is hereby incorporated by reference.). The solution to the minimal cost path problem can be visualized as a 3D array of pointing vectors along an optimal path and their associated costs with no pointing vectors pointing from empty voxels to object voxels. One pointing vector emanates from each empty voxel and terminates either on another empty voxel in its 3×3×3 neighborhood or on the target voxel (if in its 3×3×3 neighborhood). The pointing vectors will thus have lengths of either 1, $\sqrt{2}$, or $\sqrt{3}$ voxels. Each pointing vector represents a leg on the minimal cost path from the emanating empty voxel to the target voxel through some empty neighbor voxel. If the target and objects do not move, Dijkstra's algorithm need only be applied once to determine the minimal cost path from each empty voxel in the field-of-engagement to the target voxel. If the target or the objects move, then the minimal cost path needs to be periodically (at each time interval) determined from the leader voxel to the target voxel. In such a case, the SPP system may use an A* algorithm (See, Peter Hart, Nils Nilsson, and Bertram Raphael, "A Formal Basis for the Heuristic Determination of Minimum Cost Paths," IEEE Transactions on Systems Science and Cybernetics, Vol. 4, Issue. 2, pp. 100-107 (1968), which is hereby incorporated by reference.).

In some embodiments, the SPP system assigns costs to the edges based on environmental measures and, for edges connected to a follower voxel, further based on relational measures. For isolated vehicles (i.e., a vehicle not in a swarm or the leader vehicle of a swarm), the SPP system assigns costs to each graph edge based on some combination of environmental measures. For an edge $E = V_0 \rightarrow V_1$ emanating from an empty voxel $(i_0, j_0, k_0)$ and terminating on the empty neighbor voxel $(i_1, j_1, k_1)$ where $\max[|i_0 - i_1|, |j_0 - j_1|, |k_0 - k_1|] = 1$, the SPP system assigns an associated cost $c(E) = c(V_0 \rightarrow V_1)$. In general, the cost for a set $y = [y_1, \ldots y_m]$ of m environmental measures can be represented by equation 1:

$$c(E) = f(y(E)) = \max_{i=1\ldots m} c_i(y_i(E)) \qquad (1)$$

where $c_i(y_i(E)) \in [0,1]$ is a cost function for environmental measure i. An edge with a cost of one means that traversal along that edge is not allowed.

Table 1 provides examples of environmental measures that may be used by the SPP system. One environmental measure is the distance to an object (whether stationary or moving). In Table 1, DT represents the "distance transform," and DT(V) represents the voxel distance from voxel V to the nearest object voxel associated with either a stationary or moving object. The SPP system may employ various distance transform algorithms. (See, e.g., Calvin Maurer, Rensheng Qi, and Vijay Raghavan, "A Linear Time Algorithm for Computing Exact Euclidean Distance Transforms of Binary Images in Arbitrary Dimensions," IEEE Transactions on Pattern Analysis and Machine Intelligence, Vol. 25, No. 2, February 2003, pp. 265-270.) The SPP system computes DTs in real time within an instantaneous field-of-perception or in advance within a field-of-engagement. The SPP system may ignore object voxels that are too remote from the vehicle voxel, i.e., further away than a remote distance $d_{remote}$. A larger value of $d_{remote}$ leads to environmental constraints on vehicle motion dynamics that are less localized.

As indicated by Table 1, the SPP system may employ an object density measure for stationary objects $\rho_s(E)$ or moving objects $\rho_m(E)$ in a region to indicate how easy or difficult it might be to traverse that region. ($\Omega(V_0, d_{remote})$ is the cubic neighborhood of half-width $d_{remote}$ voxels centered on voxel $V_0$ at location $(i_0, j_0, k_0)$.) The SPP system increases the cost of edges as the object density measure increases. The SPP system may also employ a permeability measure $\rho_z$ of a region or zone Z on a per-voxel basis independent of object density. For example, a zone or corridor might be designated as "exclusion", "no-fly" or "fly through only if absolutely necessary." In such a case, the SPP system may input the permeability measures for the voxels of the zone. The SPP system may set the permeability measure for an edge to the maximum of $\rho_z$ for the empty voxel that the edge emanates from, and $\rho_z$ for an empty neighbor voxel.

The SPP system ensures that the cost associated with a traversal path from a vehicle voxel for an isolated vehicle to

TABLE 1

| Cost Criterion | | Example |
| --- | --- | --- |
| Name | Formula | Cost Function |
| distance to stationary objects | $d_s(E) = \min[DT_s(V_0), DT_s(V_1), d_{remote}]$ | $c_1(d_s) = 1 - d_s/d_{remote}$ |
| density of stationary objects | $\rho_s(E) = \dfrac{num \text{ obstacle voxels in } \Omega(V_0, d_{remote})}{num \text{ voxels in } \Omega(V_0, d_{remote})}$ | $c_2(\rho_s) = \dfrac{\min(\rho_s, \rho_{s,max})}{\rho_{s,max}}$ |
| distance to moving objects | $d_m(E) = \min[DT_m(V_0), DT_m(V_1), d_{remote}]$ | $c_3(d_m) = 1 - d_m/d_{remote}$ |
| density of moving objects | $\rho_m(E) = \dfrac{num \text{ mover voxels in } \Omega(V_0, d_{remote})}{num \text{ voxels in } \Omega(V_0, d_{remote})}$ | $c_4(\rho_m) = \dfrac{\min(\rho_m, \rho_{m,max})}{\rho_{m,max}}$ |
| zone/corridor permeability | $\rho_Z(E) = \max[\rho_Z(V_0), \rho_Z(V_1)]$ | $c_5(\rho_Z) = \rho_Z$ |
| disparity in edge vs. attract-repel direction | $\theta(E) = $ angle between $d_{PC}(V_0)$ and $d(E)$ | $c_6(\theta) = \dfrac{1 - \cos\theta}{2 + \varepsilon}$ ($\varepsilon$ is a small positive number) |

Figure 2:
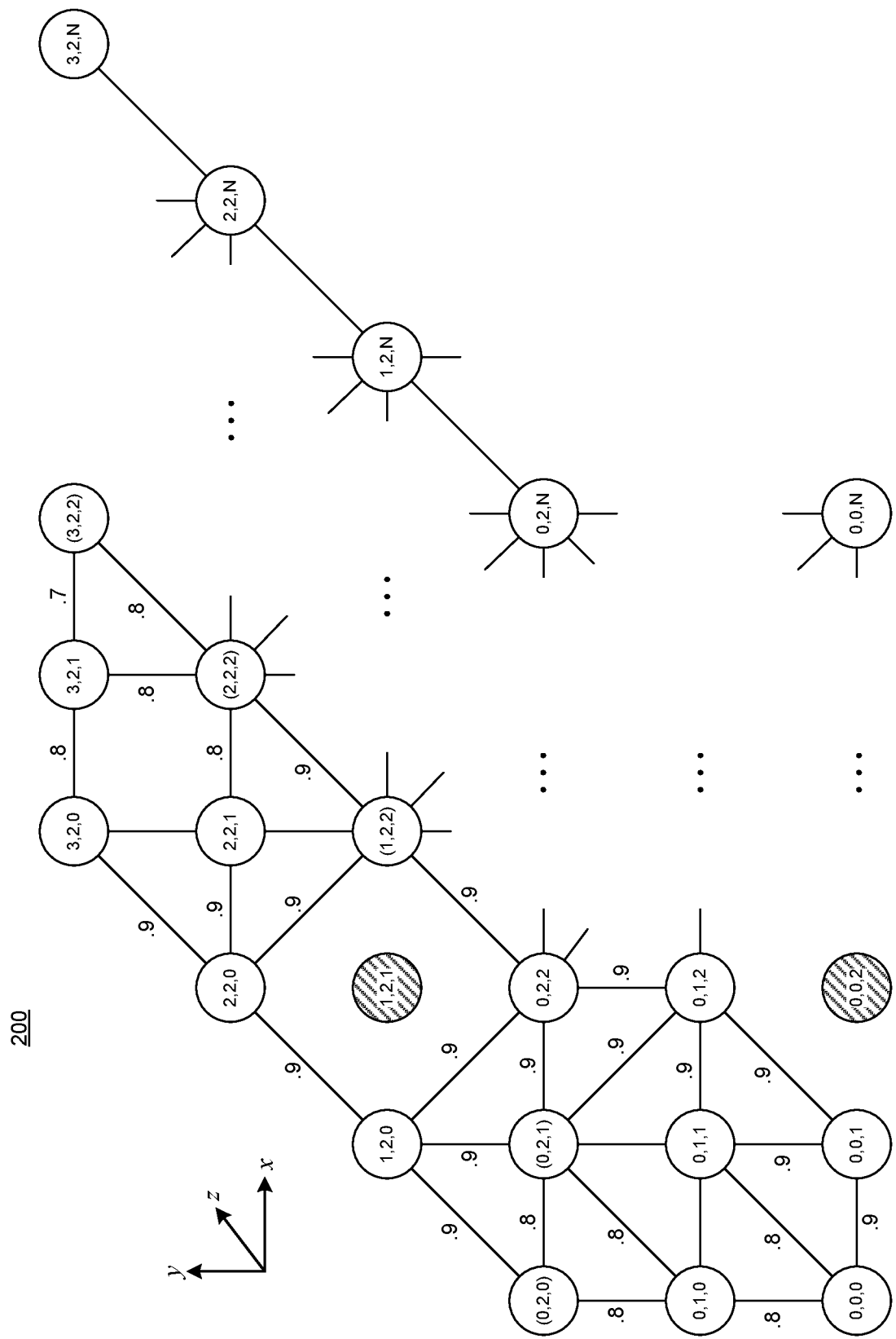
FIG. 2 is a diagram that illustrates an example cost graph that indicates costs based on the distance transforms.

FIG. 2 is a diagram that illustrates an example cost graph that indicates costs based on the distance transforms. A cost graph 200 includes vertices represented as circles that correspond to the voxels of the travel volume and edges represented as lines connecting empty voxels. Each circle contains the voxel coordinates (x, y, z) that uniquely identify each voxel. The unshaded circles represent empty voxels, and the shaded circles represent object voxels. The shaded circles have no connected edges to indicate that a travel path through the object voxel is not allowed. The numbers next to the edges represent the costs. For example, since the empty voxel (0, 0, 1) is adjacent to the object voxel (0, 0, 2), it is assigned a distance transform of 1. Since object voxels (0, 0, 0) and (0, 1, 0) are adjacent to empty voxels that have distance transforms of 1, they are assigned distance transforms of 2 (using a Manhattan distance metric). The SPP system assigns a cost of 0.9 (1.0–1.0/10) to the edge between object voxels (0, 0, 0) and (0, 0, 1) assuming the remote distance $d_{remote}$ is 10. The SPP system also assigns a cost of 0.8 (1.0–2.0/10) to the edge between object voxels (0, 0, 0) and (0, 1, 0). Thus, when determining the minimal cost path from vehicle voxel (0, 0, 0) to target voxel (3, 2, 2), the SPP system may determine path (0, 0, 0), (0, 1, 0), (0, 2, 0), (1, 2, 0), (2, 2, 0), (3, 2, 0), (3, 2, 1), and (3, 2, 2).

the target voxel increases linearly with path length. The SPP system may weight the costs by traversal distance as represented by equation 2:

$$c_{environmental}(E) = \begin{cases} (\|E\|/\sqrt{3}) \cdot c(E) & c(E) < 1 \\ 1 & c(E) = 1 \end{cases} \quad (2)$$

where $\|E\|=1$, $\sqrt{2}$ or $\sqrt{3}$. Thus, $c_{environmental}(E) \in [0,1]$, $c_{environmental}(E) \leq c(E)$, and $c_{environmental}(E)=1$ if and only if $c(E)=1$ (i.e., traversal from $V_0$ to V is not allowed).

Autonomous Control of Vehicle Swarm Motion Dynamics

The SPP system may consider a swarm of N>1 vehicles to contain one leader vehicle and N−1 follower vehicles. The SPP system represents a vehicle swarm as a graph with a tree topology (a vehicle swarm tree) in which the root vertex represents the leader vehicle and the leaf vertices represent the follower vehicles.

As described above, the SPP system constrains the motion dynamics of the leader vehicle by environmental measures. The SPP system constrains the motion dynamics of the follower vehicles not only by these environmental measures but also by relational measures that constrain the motion dynamics of the follower vehicles relative to the motion dynamics of the leader vehicles. The SPP system may express the relations between follower vehicle and leader vehicle motion dynamics statistically by assigning probability density functions to attributes of the edges in the vehicle swarm tree, leading to a stochastic vehicle swarm tree. The SPP system may represent a stochastic vehicle swarm tree using distributionally attributed relational trees ("DARTs"). (See, eq., David W. Paglieroni and Faranak Nekoogar, "Matching Random Tree Models of Spatio-Temporal Patterns to Tables or Graphs," Proc. IEEE Conf. Computational Intelligence and Data Mining (CIDM), Honolulu, HI, Apr. 1-5, 2007, pp. 560-567.)

The SPP system represents relational measures that constrain motion dynamics of a follower vehicle relative to motion dynamics of the leader vehicle by n attributes $x=[x_1, \ldots x_n]$ of edges in a vehicle swarm tree. Since the vehicle swarm tree is stochastic, the attributes are random variables with prescribed probability densities $\{p_i(x)\}_{i=1}^n$ (such as Gaussian densities). For a given attribute, the density could (but typically would not) vary from edge to edge. The set of densities $\tilde{p}=\{\tilde{p}_i(x)\}_{i=1}^n$ may be normalized to the range [0,1]. The SPP system may employ a cost function for relational measures as represented by equation 3:

$$c_{relational}(E \mid E_0) = 1 - \prod_{i=1}^{n} \tilde{p}_i(x_i(E \mid E_0)) \in [0, 1] \quad (3)$$

where the value $x_i(E|E_0)$ of edge relational attribute $x_i$ (a random variable) depends on the graph edge $E_0$ that the leader vehicle traversed at a particular instant of time and the graph edge E that the follower vehicle traversed in response at that same instant of time (where graph edges connect empty neighbor voxels). In general, the value of an attribute $x_i$ that relates motion dynamics of a follower vehicle to the leader vehicle depends on the motion of both vehicles. Graph edge $E_0$ characterizes leader vehicle motion, and graph edge E characterizes follower vehicle motion where $c_{relational}(E|E_0)=0$ if and only if $\tilde{p}_i(x_i(E|E_0))=1 \forall i$. The SPP system may consider variables for relations between leader vehicle motion dynamics and follower vehicle motion dynamics as illustrated in Table 2.

TABLE 2

| Variable Name | Formula |
| --- | --- |
| casting separation | $\Delta_E = E_{follower} - E_{leader}$ |
| northing separation | $\Delta_N = N_{follower} - N_{leader}$ |
| height separation | $\Delta_H = H_{follower} - H_{leader}$ |
| distance separation | $\Delta_D = \|[\Delta_E, \Delta_N, \Delta_H]\|$ |
| azimuth separation | $\Delta_\alpha = \alpha_{follower} - \alpha_{leader}$ |
| elevation angle separation | $\Delta_\tau = \tau_{follower} - \tau_{leader}$ |

For follower vehicles, the traversal cost to a neighbor voxel depends on both relational and environmental constraints, whichever is more stringent, as represented by equation 4:

$$c_{overall}(E|E_0) = \max[c_{environmental}(E), c_{relational}(E|E_0)] \quad (4)$$

where $c_{environmental}(E)$ is the environmental cost incurred when the follower vehicle traverses edge E from its current voxel, $c_{relational}(E|E_0)$ is the relational constraint cost incurred when the follower vehicle traverses edge E from its current voxel given that the leader vehicle traversed edge $E_0$ from its current voxel, and $c_{overall}(E|E_0)$ is the overall (net) cost incurred by the follower vehicle. At a specified instant of time, given that the leader vehicle traversed edge $E_0$, the path that the follower vehicle takes will be along the edge E from its current voxel that minimizes $c_{overall}(E|E_0)$. There is thus no need to solve a minimal cost path problem for follower vehicles.

Figure 3:
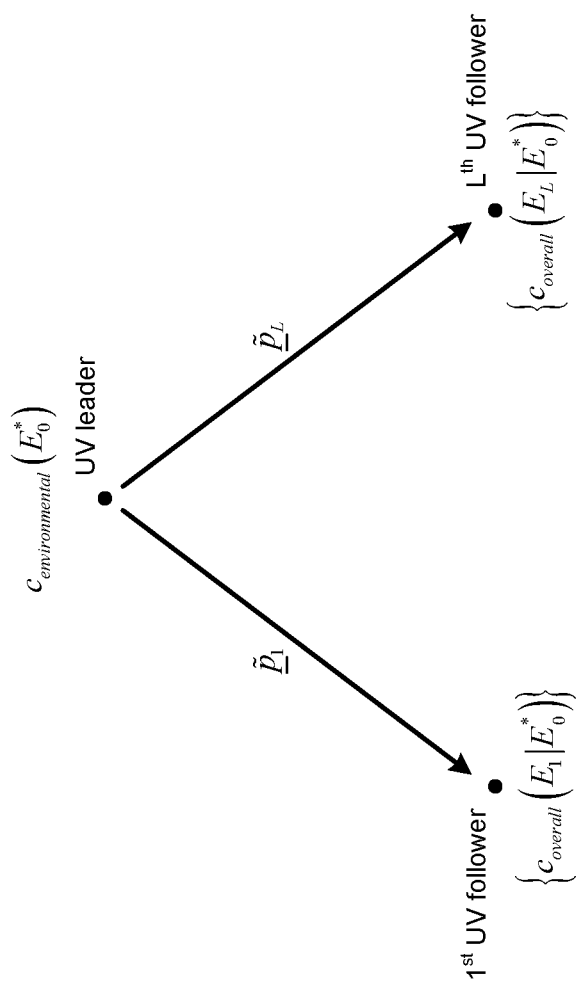
FIG. 3 is a diagram that illustrates the relationship between a leader vehicle and its follower vehicles.

FIG. 3 is a diagram that illustrates the relationship between a leader vehicle and its follower vehicles. In FIG. 3, the cost $c_{environmental}(E^*)$ is for the optimal edge $E^*$ emanating from the leader vehicle, and $\{c_{overall}(E|E^*)\}$ is the set of costs for all possible edges E emanating from a follower voxel to follow the leader vehicle that travels along optimal edge $E^*$.

Autonomous Control of Multiple UV Swarms

The SPP system may hierarchically extend the stochastic vehicle swarm trees to enable joint control of the motion dynamics for multiple vehicle swarms. In a hierarchical stochastic UV swarm tree, the root vertex represents the vehicle swarm that leads, and the leaf vertices represent the vehicle swarms that follow. The hierarchy of a vehicle swarm tree can be extended such that in a second-level hierarchy, the root vertex represents a set of vehicle swarms that lead (the leader swarm), and the leaf vertices represent sets of vehicle swarms that follow (the follower swarms).

In the SPP system, hierarchical swarm trees govern the motion dynamics of follower swarms that follow relative to the motion dynamics of the leader swarm. Within a hierarchy of vehicle swarm trees, the motion dynamics of follower swarms are relative to their leader swarm and are governed by the edge attribute densities for the specific vehicle swarm tree.

Figure 4:
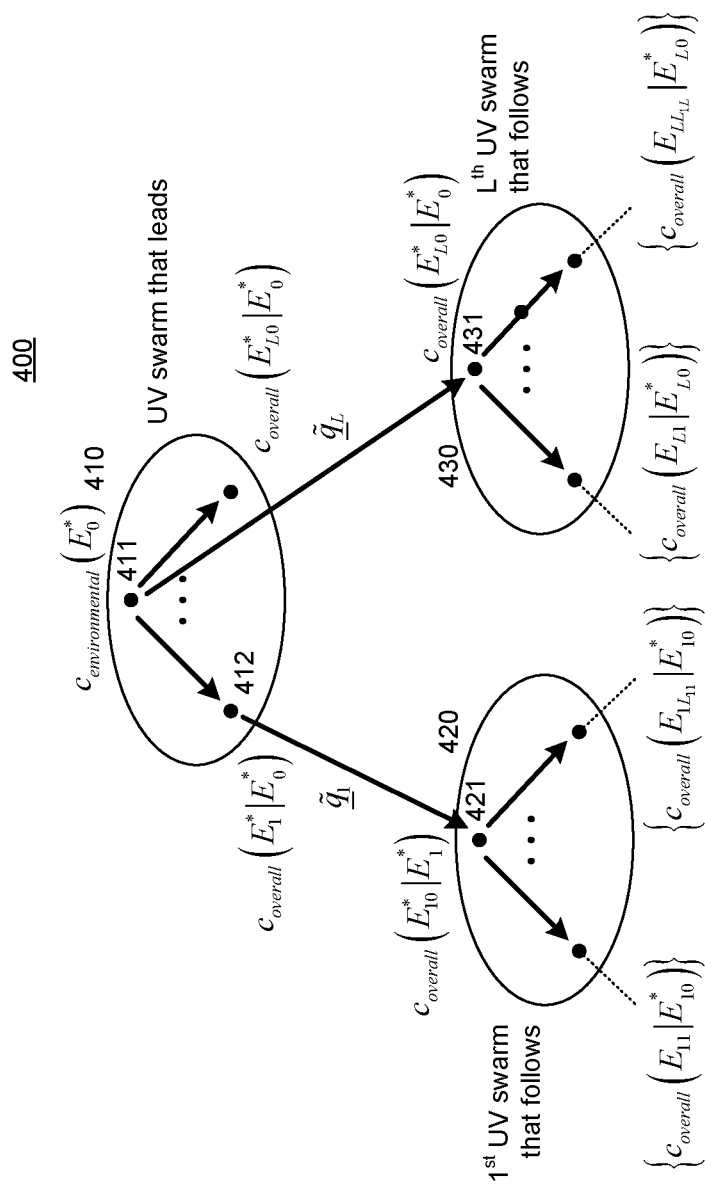
FIG. 4 is a diagram that illustrates the relationship between a leader swarm and its follower swarms.

In a hierarchical vehicle swarm tree, the leader vehicle of a follower swarm follows some vehicle in the leader swarm that is the leader vehicle or a follower vehicle of the leader swarm. FIG. 4 is a diagram that illustrates the relationship between a leader swarm and its follower swarms. In FIG. 4, a hierarchical vehicle swarm tree 400 contains one leader swarm 410 that leads and L follower swarms 420, 430. The leader 421 of the 1$^{st}$ follower swarm follows vehicle 412, which is a follower vehicle of the leader swarm, and the leader 431 of the L$^{th}$ follower follows the leader vehicle 411 of the leader swarm. For $k=1 \ldots L$, the vehicle of the k$^{th}$ follower swarm could follow any vehicle $u_k \in \{0 \ldots L_0\}$ from the leader swarm. The densities $\tilde{q}=\{\tilde{q}_i(x)\}_{i=1}^n$ may be normalized to the range [0,1] that applies to attributes $x=[x_1 \ldots x_n]$ relating motion dynamics of a follower swarm that follows to the leader swarm. In this case, equation 3 applies with $\tilde{p}$ replaced by $\tilde{q}$, where $x_i(E|E_0)$ is the value of relational attribute $x_i$ (a random variable) when edge $E_0$ emanates from some vehicle in the leader swarm, and in response, edge E emanates from the leader vehicle in the follower swarm.

As depicted in FIG. 4, the leader swarm contains $L_0$ follower vehicles. For $k=1 \ldots L$, the k$^{th}$ follower swarm contains $L_{1k}$ follower vehicles, $c_{environmental}(E^*_0)$ represents the cost associated with the optimal edge $E_0$ emanating from the leader vehicle of the leader swarm, $c_{overall}(E^*_i|E^*_j)$ represents the cost for the optimal edge $E^*_i$ emanating from a follower vehicle given that edge $E^*_j$ emanates from the leader vehicle, and $\{c_{overall}(E_i|E^*_j)\}$ represents the set of costs for all edges $E_i$ emanating from a follower vehicle given that the optimal edge emanating from the leader vehicle is $E^*_j$.

Vehicle Swarm Behavioral Personalities

As described above, the SPP system employs environmental and relational measures to control the direction of vehicle travel. The SPP system may use a behavioral personality of a vehicle to control speed of traversal, i.e., how aggressively the target voxel will be pursued. The behavioral personality of a vehicle swarm is defined by the behavioral personality of the leader vehicle because motion dynamics of follower vehicles are somehow correlated with motion dynamics of the leader vehicle.

The SPP system may prescribe the behavioral personality of a vehicle by adjusting the time interval $\Delta_t$ between control commands. As $\Delta_t$ decreases, the number of looks (e.g., with the radar or sonar on-board the UV) increases, thereby decreasing the likelihood of a collision. However, UV velocity may decrease. Within a time interval of $\Delta_t$, the vehicle will travel a distance of $\Delta$ (one voxel), $\sqrt{2}\Delta$, or $\sqrt{3}\Delta$ (i.e., a maximum distance of $\sqrt{3}\Delta$). The speed of vehicle travel will thus be $v \leq \sqrt{3}\Delta/\Delta_t$. If the vehicle is capable of traveling no faster than $v_{max}$, then $\Delta_{t,min} = \sqrt{3}/v_{max}$. As $\Delta_t$ decreases, the vehicle behavioral personality becomes more aggressive. The behavioral personality also factors in the tolerance of a vehicle to risk (e.g., collision). Thus, the behavioral personality factors in not only vehicle speed but also the distance $d_{remote}$ beyond which an object is ignored. As $d_{remote}$ decreases, the tolerance of a vehicle to risk increases.

Figure 5:
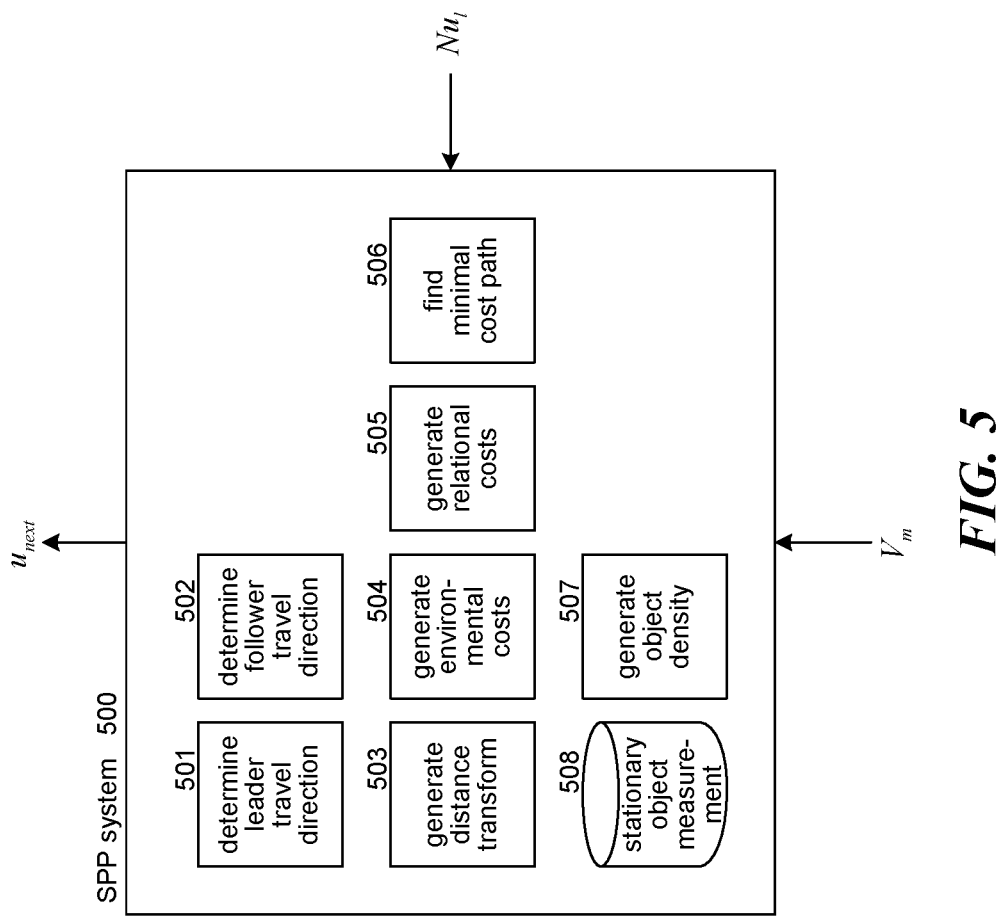
FIG. 5 is a block diagram illustrating components of the SPP system in some embodiments.

FIG. 5 is a block diagram illustrating components of the SPP system in some embodiments. An SPP system 500 includes a "determine leader travel direction" component 501, a "determine follower travel direction" component 502, a "generate distance transform" component 503, a "generate environmental costs" component 504, a "generate relational costs" component 505, a "find minimal cost path" component 506, and a "generate object density" component 507. The SPP system also includes a stationary object measurement store 508 that stores distance transform measurements and density measurements for stationary objects. These measurements may be calculated prior to travel by a non-onboard computer system and loaded into the onboard stationary object measurement store. The "determine leader travel direction" component determines a next leader voxel as the indication of the travel direction of a vehicle. Although the component is referred to as the "determine "leader" travel direction" component, it can be used to determine the travel direction of a vehicle irrespective of whether the vehicle is leading other vehicles or is a single isolated vehicle that is not leading other vehicles. The "determine follower travel direction" component identifies a next voxel as the indication of the travel direction of a follower vehicle. The "generate distance transform" component generates the distance transform for the field-of-engagement. The "generate environmental costs" component generates the environmental costs associated with objects. The "generate relational costs" component generates relational costs associated with a follower vehicle following a leader vehicle. The "find minimal cost path" component finds a minimal cost path from the leader voxel to a target voxel based on environmental costs, for example, using Dijkstra's algorithm with a Fibonacci heap or an A* algorithm.

The computing systems on which the OSA system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the OSA system. The data transmission media are used for transmitting data via transitory, propagating signals or carrier waves (e.g., electromagnetism) via a wired or wireless connection.

The OSA system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the OSA system may be implemented in hardware using, for example, an application-specific integrated circuit (ASIC).

Figure 6:
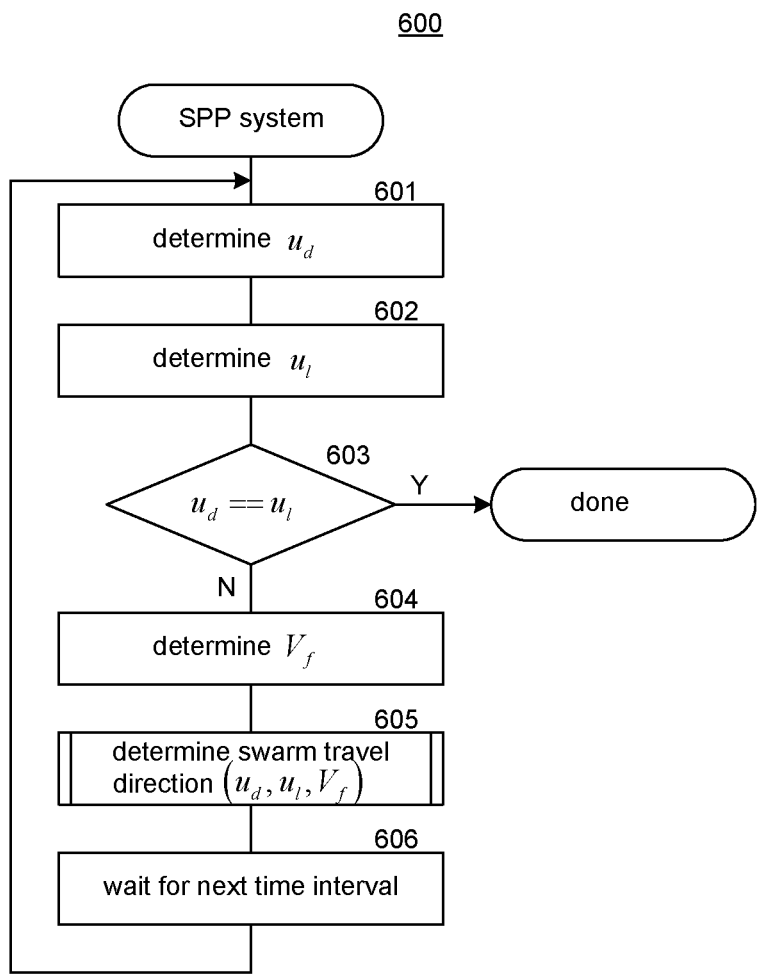
FIG. 6 is a flow diagram that illustrates overall processing of SPP system to lead a swarm to a target voxel in some embodiments.

FIG. 6 is a flow diagram that illustrates overall processing of SPP system to lead a swarm to a target voxel in some embodiments. A component 600 of the SPP system generates the travel directions for the leader and the followers at each time interval. In block 601, the component determines the current target voxel $u_d$ as the target may be moving. In block 602, the component determines the current leader voxel $u_l$ of the leader. In decision block 603, if the current leader voxel is the same as the current target voxel, then the swarm has reached the target and the component completes, else the component continues at block 604. In block 604, the component determines the current follower voxels $V_f$ of the followers. In block 605, the component invokes a "determine travel direction" component passing an indication of the target voxel $u_d$, the leader voxel $u_l$, and the follower voxels $V_f$. In block 606, the component waits for the next time interval and loops to block 601 to determine the next travel direction.

Figure 7:
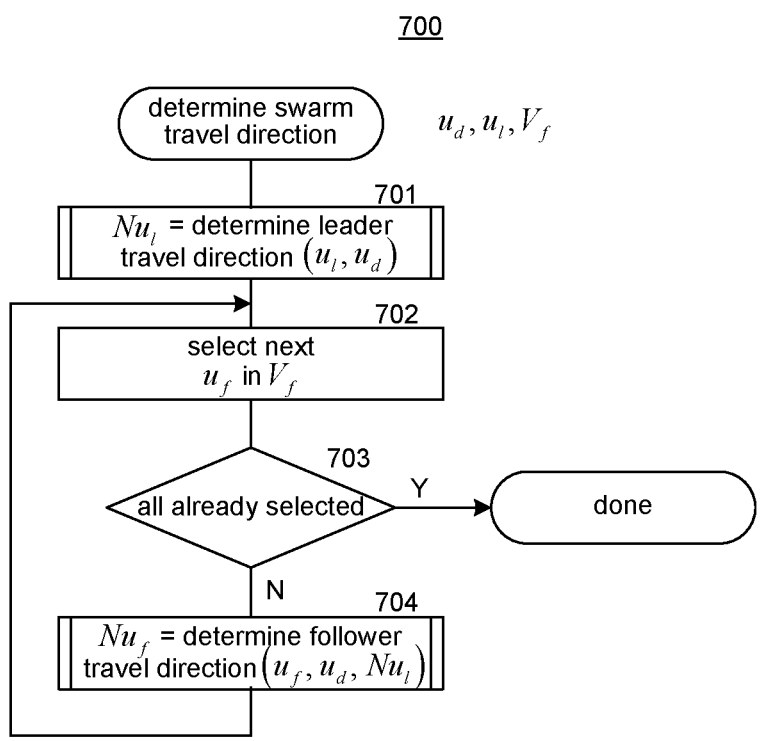
FIG. 7 is a flow diagram that illustrates the processing of "determine swarm travel direction" component in some embodiments.

FIG. 7 is a flow diagram that illustrates the processing of a "determine swarm travel direction" component in some embodiments. A "determine swarm travel direction" component 700 illustrates the overall processing of the SPP system to generate travel directions for a swarm. The component inputs the target voxel $u_d$, the leader voxel $u_l$, and the follower voxels $V_f$. In block 701, the component invokes the "determine leader travel direction" component passing an indication of the leader voxel and the target voxel and receives an indication of the next leader voxel $Nu_l$ that is in the travel direction. In blocks 702-704, the component loops identifying the travel direction for the follower vehicles. In block 702, the component selects the next follower vehicle f. In decision block 703, if all the follower vehicles have already been selected, then the component completes, else the component continues at block 704. In block 704, the component invokes the "determine follower travel direction" component passing an indication of a follower voxel $u_f$, a target voxel, and the next leader voxel and receives an indication of the next follower voxel $Nu_f$ as the travel direction for the vehicle, and then it loops to block 702 to select the next follower vehicle. The "determine leader travel direction" component may be implemented on the leader vehicle, and the "determine follower travel direction" component may be implemented on each follower vehicle. Alternatively, these components can be implemented by a computing system that is not onboard, such as a ground station or a master vehicle that is traveling with the swarm that may include the object detection component that identifies objects for the swarm. Also, the leader vehicle may transmit the next leader voxel to the follower vehicles, or each follower vehicle may independently calculate the next leader voxel (assuming it is capable of detecting all the objects that the leader vehicle uses to identify the next leader voxel). Each vehicle in the swarm may consider every other vehicle in the swarm to be a moving object to prevent collisions with the other vehicles of the swarm.

Figure 8:
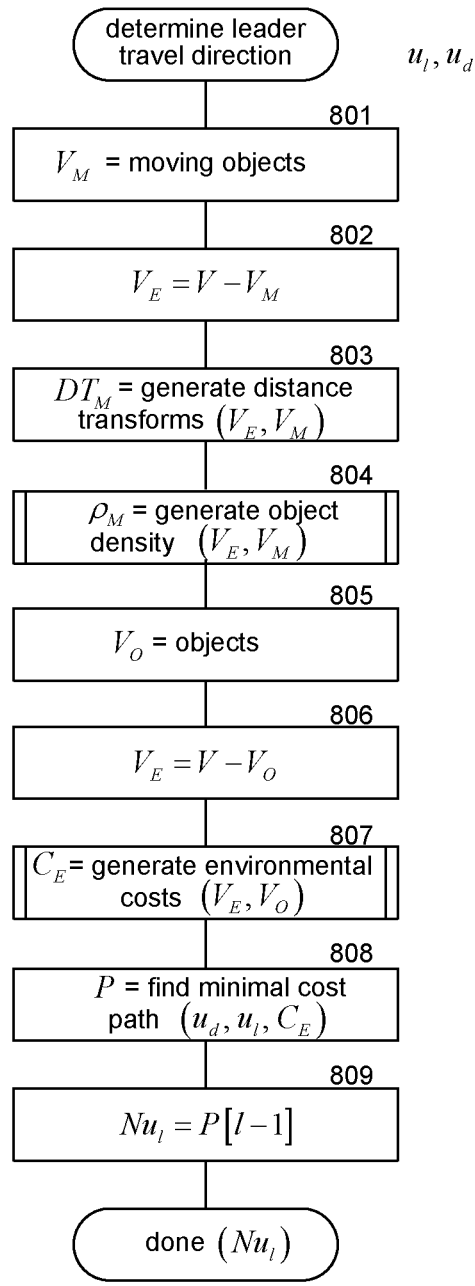
FIG. 8 is a flow diagram that illustrates the processing of "determine leader travel direction" component in some embodiments.

FIG. 8 is a flow diagram that illustrates the processing of a "determine leader travel direction" component in some embodiments. A "determine leader travel direction" component 800 is passed an indication of a leader voxel $u_l$ and a target voxel $u_d$ and determines a next leader voxel $Nu_l$ that is in the travel direction. In block 801, the component identifies the moving object voxels $V_M$ in the field-of-perception. In block 802, the component identifies the empty voxels $V_E$ in the field-of-perception. In block 803, the component invokes the generate distance transform component passing an indication of the object voxels and the empty voxels and receives a 3D distance transform matrix $DT_M$ that specifies the distance of a voxel to the nearest object voxel. The "generate distance transform" component may generate the distance using the algorithm described in Maurer, et al. In block 804, the component invokes the generate object density component passing an indication of the object voxels and the empty voxels and receives an 3D object density matrix $\rho_M$ indicating the object density associated with each empty voxel. In block 805, the component identifies all object voxels $V_O$ in the field-of-perception. In block 806, the component identifies the non-object or empty voxels $V_E$ in the field-of-perception. In block 807, the component invokes the "generate environmental costs" component passing an indication of the empty voxels and the object voxels and receiving a cost graph $C_E$ indicating an environmental cost of traveling between each pair of empty neighbor voxels. In block 808, the component invokes a find minimal cost path component passing an indication of the leader voxel, the target voxel, and the cost graph C and receiving an indication of the minimal cost path P to travel from the leader voxel to the target voxel. In block 809, the component extracts from the path the neighbor voxel of the leader voxel as the next leader voxel and completes, returning an indication of the next leader voxel to indicate the travel direction.

Figure 9:
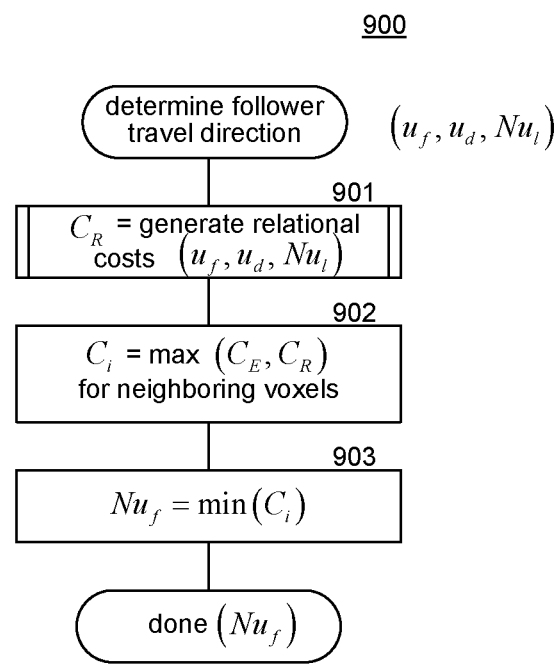
FIG. 9 is a flow diagram that illustrates the processing of "determine follower travel direction" component in some embodiments.

FIG. 9 is a flow diagram that illustrates the processing of a "determine follower travel direction" component in some embodiments. A "determine follower travel direction" component 900 is passed an indication of a follower voxel $u_f$, a target voxel $u_d$, and a next leader voxel $Nu_l$ and determines a next follower voxel $Nu_f$ that is in the travel direction. In block 901, the component invokes a "generate relational costs" component passing an indication of the follower voxel, the target voxel, and the next leader voxel and a relational cost graph $C_R$ indicating a relational cost of traveling between each pair of empty neighbor voxels. In block 902, the component combines the environmental costs and the relational costs into a cost $C_i$ by, for example, taking the maximum of the environmental cost and the relational cost for each edge to a neighboring empty voxel. In block 903, the components elects as the next follower voxel the neighboring voxel connected by the edge with the minimal cost $C_i$ and completes returning an indication of the next follower voxel to indicate the travel direction.

Figure 10:
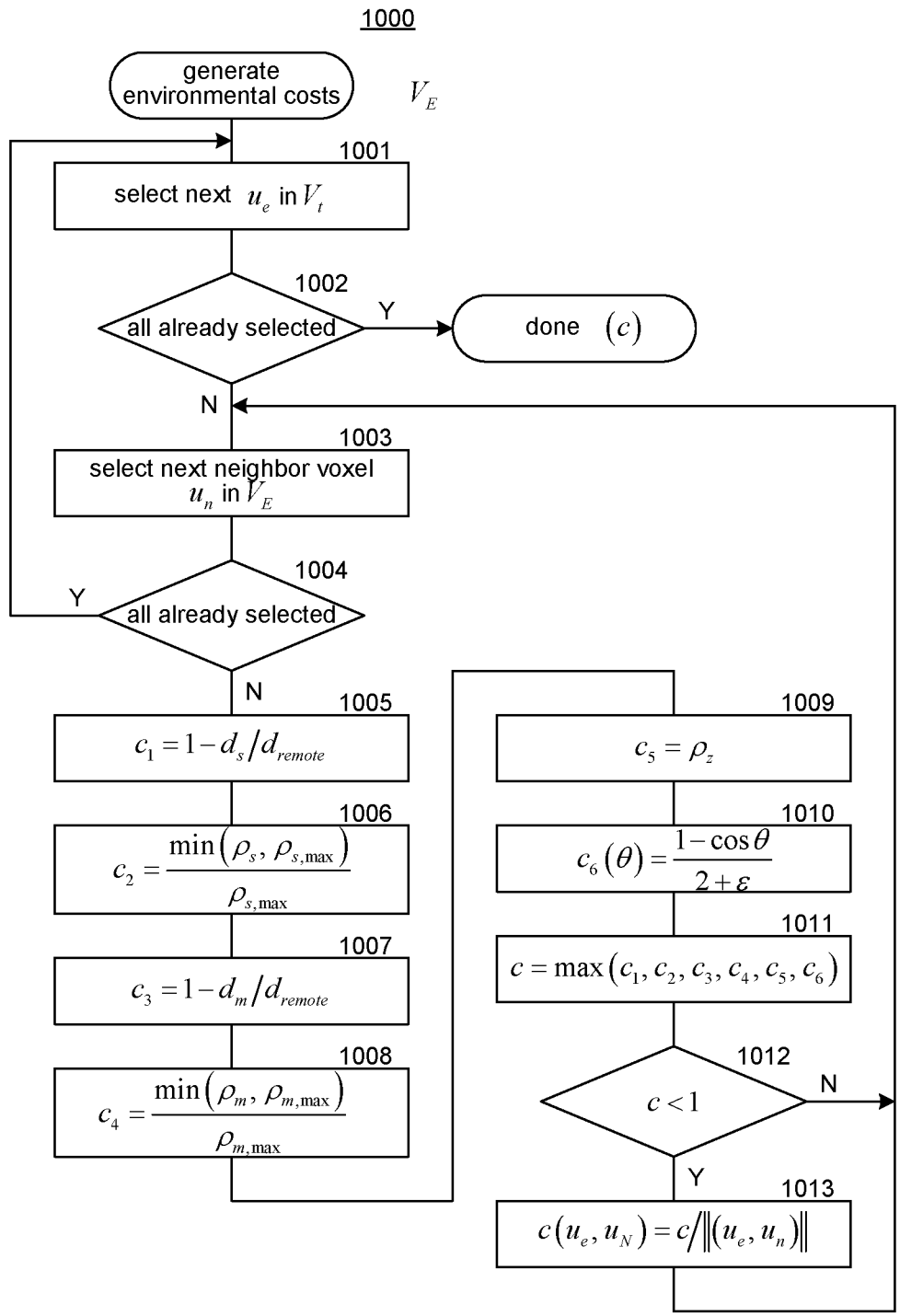
FIG. 10 is a flow diagram that illustrates the processing of a "generate environmental costs" component in some embodiments.

FIG. 10 is a flow diagram that illustrates the processing of a generate environmental costs component in some embodiments. A generate environmental costs component 1000 is invoked passing an indication of empty voxels $V_E$ and generates the environmental costs associated with traveling between pairs of empty voxels. The component generates an environmental cost for each empty voxel. Although the flow diagram illustrates that distance to stationary objects $c_1$ and density of stationary objects $c_2$ are calculated periodically, in practice they only need to be calculated once. Also, the distance to moving objects $c_3$ and density of moving objects $c_4$ need only be calculated locally for empty voxels in the field-of-perception. In block 1001, the component selects the next empty voxel $u_e$. In decision block 1002, if all the empty voxels have already been selected, then the component returns an indication of the cost graph C, else the component continues at block 1003. In block 1003, the component selects the next empty neighbor voxel $u_n$ of the selected empty voxel. In decision block 1004, if all the empty neighbor voxels have already been selected, then the component loops to block 1001 to select the next empty voxel, else the component continues at block 1005. In block 1005, the component sets a first cost based on distance to stationary objects. In block 1006, the component sets a second cost based on density of stationary objects. In block 1007, the component sets a third cost based on distance to moving objects. In block 1008, the component sets a fourth cost based on density of moving objects. In block 1009, the component sets a fifth cost based on permeability. In block 1010, the component sets a sixth cost based on disparity. In block 1011, the component sets an unscaled cost to the maximum of the first through sixth costs. In decision block 1012, if the unscaled cost is less than one, then the component continues at block 1013, else the component loops to block 1003 to select the next empty neighbor voxel. In block 1013, the component sets the cost for the edge between the selected empty voxel and the selected neighbor voxel to the unscaled cost scaled by the distance between the selected empty voxel and the selected neighbor voxel.

Figure 11:
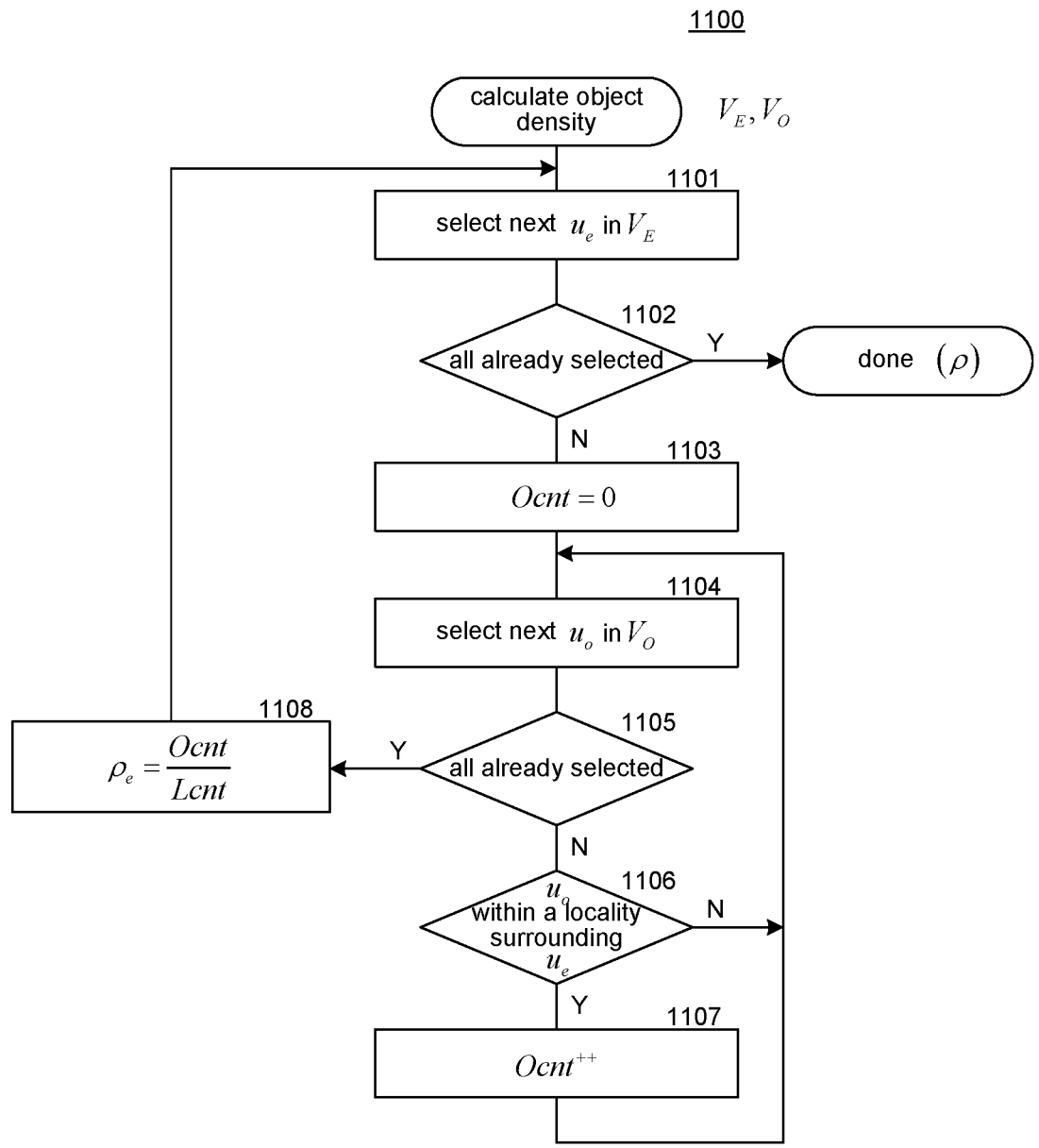
FIG. 11 is a flow diagram that illustrates the processing of a "calculate object density" component in some embodiments.

FIG. 11 is a flow diagram that illustrates processing of a "calculate object density" component in some embodiments. A "calculate object density" component 1100 is passed an indication of object voxels $V_O$ and empty voxels $V_E$ and identifies the object density associated with each empty voxel. The component calculates object densities within a moving cube of half-width $d_{remote}$. The flow diagram illustrates the logic of such calculations. In block 1101, the component selects the next empty voxel $u_e$. In decision block 1102, if all the empty voxels have already been selected, then the component completes, returning an indication of the object densities for the empty voxels, else the component continues at block 1103. In block 1103, the component initializes an object count. In block 1104, the component selects the next object voxel $u_o$. In decision block 1105, if all such object voxels have already been selected, then the component continues at block 1108, else the component continues at block 1106. In decision block 1106, if the selected object voxel is within a locality surrounding the selected empty voxel, then the component continues at block 1107, else the component loops to block 1104 to select the next object voxel. In block 1107, the component increments an object count and then loops to block 1104 to select the next object voxel. In block 1108, the component sets a density for the selected empty voxel to the ratio of the number of object voxels within its locality to the number of voxels within its locality and then loops to block 1101 to select the next empty voxel.

Figure 12:
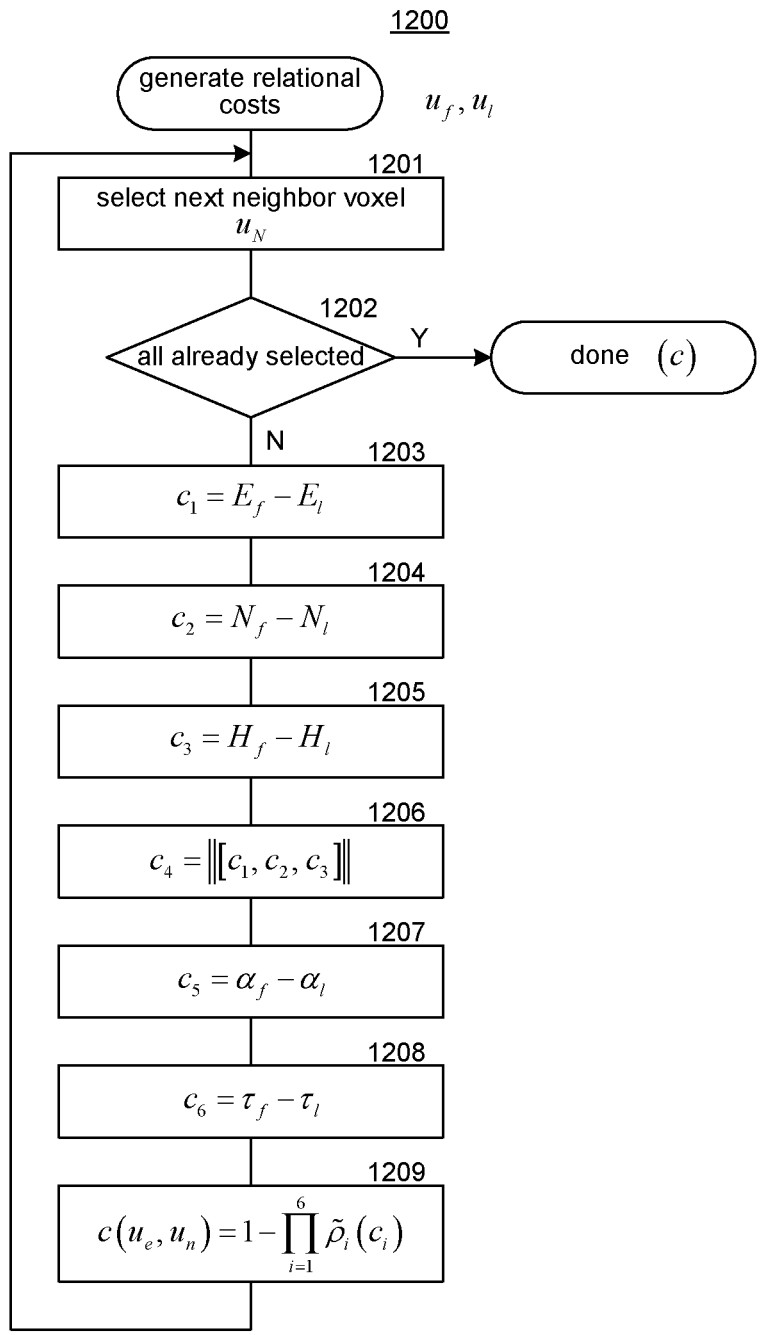
FIG. 12 is a flow diagram that illustrates processing of a "generate relational costs" component in some embodiments.

FIG. 12 is a flow diagram that illustrates the processing of a "generate relational costs" component in some embodiments. A "generate relational costs" component 1200 is passed an indication of a follower voxel $u_f$, and a next leader voxel $u_l$ and calculates a relational cost graph C associated with traveling from the follower voxel to each empty neighbor voxel $u_n$. Although the component is illustrated as using all the relational costs of Table 2, the component may use any subset of the relational costs of Table 2. In block 1201, the component selects the empty neighbor voxel of the follower voxel. In decision block 1202, if all the empty neighbor voxels have already been selected, then the component completes, returning an indication of the cost graph, else the component continues at block 1203. In block 1203, the component sets a first cost based on an easting separation between the leader voxel and the neighbor voxel. In block 1204, the component sets a second cost based on a northing separation between the leader voxel and the neighbor voxel. In block 1205, the component sets a third cost based on a height separation between the leader voxel and the neighbor voxel. In block 1206, the component sets a fourth cost based on a distance separation between the leader voxel and the neighbor voxel. In block 1207, the component sets a fifth cost based on an azimuth separation between the leader voxel and the neighbor voxel. In block 1208, the component sets a sixth cost based on an elevation angle separation between the leader voxel and the neighbor voxel. In block 1209, the component sets the environmental cost of traveling from the follower voxel to the neighbor voxel to one minus the product of a probability function for each type of cost applied to the cost. The component then loops to block 1201 to select the next empty neighbor voxel of the follower voxel.

Figure 13:
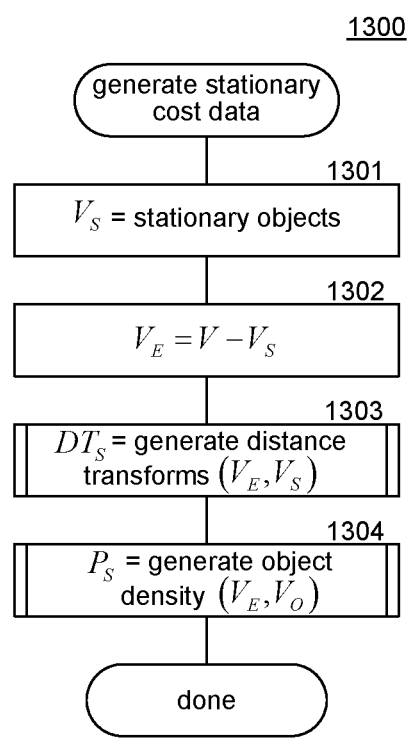
FIG. 13 is a flow diagram that illustrates processing of a "generate stationary cost data" component in some embodiments.

FIG. 13 is a flow diagram that illustrates processing of a "generate stationary cost data" component in some embodiments. A "generate stationary cost data" component 1300 is invoked to generate environmental measurements associated with stationary objects in the field-of-engagement. The component may be executed by a computing system that is not onboard prior to travel. In block 1301, the component identifies the stationary voxels $V_S$. In block 1302, the component identifies the empty voxels $V_E$. In block 1303, the component invokes the "generate distance transform" component passing an indication of the stationary voxels and the empty voxels to set the distance of each empty voxel to the nearest object voxel. In block 1304, the component invokes the generate object density function passing an indication of the empty voxels and the object voxels and receiving an indication of the density associated with each empty voxel. The component then completes.

The following paragraphs describe various embodiments of aspects of the OSA system. An implementation of the OSA system may employ any combination of the embodiments. The processing described below may be performed by a computing device with a processor that executes computer-executable instructions stored on a computer-readable storage medium that implements the OSA system.

A method performed by a computing system for identifying, for a swarm of vehicles, travel paths through a travel volume having empty locations and object locations is provided. For each pair of empty locations of the travel volume, the method calculates an environmental measure associated with traveling between the empty locations. The environmental measure are based on object locations near the pair of empty locations. The method determines a leader travel path for a leader vehicle of the swarm to travel from a leader location to a target location based on the environmental measures. For each pair of a follower location of a follower vehicle and an empty neighbor location, the method calculates a relational measure for the follower vehicle associated with traveling from the follower location to the empty neighbor location. The relational measure is associated with traveling from the follower location to the empty neighbor location being based on maintaining a positional relationship with the leader vehicle based on the leader travel path. For each follower vehicle, the method identifies a follower travel path for the follower vehicle to follow the leader vehicle based on the environmental measures and the relational measures. In some embodiments, the identifying of a travel path comprises applying a minimal cost path algorithm to a cost graph for traveling from any location to a specific destination location, where vertices represent locations, edges between vertices represent that the locations of the vertices are neighbors, and costs derived from the environmental measures are associated with the edges.

In some embodiments, the swarm travels through a travel volume of voxels with each location being at the center of a voxel. In some embodiments, the method further specifies as a leader travel direction the direction along the leader travel path, and for each of the follower vehicles, specifies as a follower travel direction the direction along the follower travel path for that follower vehicle. In some embodiments, the environmental measures are based on locations of objects that the vehicles are to avoid. In some embodiments, the environmental measures associated with stationary vehicles are calculated prior to travel and the environmental measures associated with moving vehicles are calculated during travel. In some embodiments, the environmental measures are selected from a set consisting of a distance transform measure, an object density measure, and a zone permeability measure. In some embodiments, relational measures are selected from a set consisting of an easting separation measure, a northing separation measure, a height separation measure, a distance separation measure, an azimuth separation measure, and an elevation angle separation measure. In some embodiments, the relational measures are treated as random variables governed by probability density functions. In some embodiments, the calculation of the relational measures and determination of the travel paths are performed at regular time intervals during travel of the swarm. In some embodiments, the calculation of the environmental measures associated with moving objects is performed at regular time intervals during travel of the swarm. In some embodiments, the regular time interval is adjusted based on risk tolerance of a vehicle colliding with an object. In some embodiments, each vehicle of the swarm determines its travel path during each time interval. In some embodiments, the leader vehicle of the swarm determines the leader travel path during each time interval. In some embodiments, each follower vehicle calculates its relational costs during each time interval. In some embodiments, some environmental cost measures are updated based on locations of objects that are within a specified remote distance of the current vehicle location. In some embodiments, the remote distance is adjusted based on risk tolerance of a vehicle colliding with an object. In some embodiments, the swarm is a leader swarm and a follower swarm of vehicles follows the leader swarm and wherein a leader vehicle of the follower swarm follows a designated vehicle in the leader swarm. In some embodiments, the method further calculates relational measures for the leader vehicle of the follower swarm associated with traveling from a leader location of the follower swarm to a neighboring location. The relational measures are based on the leader vehicle of the follower swam following the travel path of a designated leader vehicle from the leader swarm. In some embodiments, the method further directs each vehicle to travel in the direction of its travel direction.

In some embodiments, a method performed by a computing system for identifying a travel path based on locations for a vehicle to travel from a current location to a target location is provided. The method accesses indications of object locations associated with objects that the vehicle is to avoid and empty locations not associated with objects that the vehicle is to avoid. For each empty location and each empty neighbor location, the method calculates a cost of traveling from that empty location to that empty neighbor location. The method applies a minimal cost path algorithm to a graph to determine a travel path between the current location and the target location, where vertices of the graph represent locations, edges of the graph connect empty neighbor voxels, and the costs are associated with the edges. In some embodiments, the method further specifies a travel direction for the vehicle as the direction of the neighbor location of the vehicle location that is along the travel path. In some embodiments, the method further directs the vehicle to travel in the travel direction. In some embodiments, the costs are based on a distance transform that identifies the distance from an empty location to the nearest object location. In some embodiments, prior to travel, the method calculates stationary costs based on stationary objects and, during travel, the method calculates moving costs based on moving objects. The calculating calculates the cost for traveling from an empty location to an empty neighbor location to be a minimum of the stationary cost and the moving cost for the empty neighbor location. In some embodiments, the costs are calculated based on environmental measures that include a transform distance measure, an object density measure, and a zone permeability measure. In some embodiments, the calculating calculates the cost of traveling from an empty location to an empty neighbor location to be a minimum of a cost associated with the transform distance measure, a cost associated with the object density measure, and a cost associated with the zone permeability measure. In some embodiments, the minimal cost path algorithm is a Dijkstra-based algorithm. In some embodiments, the minimal cost path algorithm employs a Fibonacci heap. In some embodiments, the method further, for each of a plurality of time intervals calculates current costs based on a current vehicle location, a current target location, and current object locations and applies the minimal cost path algorithm based on the current costs to identify a current travel path. In some embodiments, the method, for each of the plurality of time intervals, specifies a current travel direction as the direction of the empty neighbor location of the current vehicle location that is along the current travel path. In some embodiments, a time interval is adjusted based on risk tolerance of the vehicle colliding with an object. In some embodiments, the objects exclude objects that are more than a remote distance from the current vehicle location. In some embodiments, the remote distance is adjusted based on risk tolerance of the vehicle colliding with the object.

In some embodiments, a computing system for identifying, for a swarm of vehicles, travel paths through a travel volume of voxels is provided. The computing system comprises one or more computer-readable storage media storing computer-executable instructions and one or more processors that execute the computer-executable instructions stored in the computer-readable storage media. The instructions control the computing system to calculate environmental costs associated with traveling from each of a plurality of empty voxels to empty neighbor voxels. The instructions control the computing system to determine a leader travel path for a leader vehicle of the swarm based on environmental costs to travel from a leader voxel to a target voxel. The instructions control the computing system to direct the leader vehicle to travel along the leader travel path. For each follower vehicle of the swarm, the instructions control the computing system to calculate relational costs associated with traveling from a follower voxel to empty neighbor voxels, the relational costs based on cost of following the leader travel path, identify a follower travel path for the follower vehicle based on the environmental costs and the relational costs to follow the leader vehicle, and direct the follower vehicle to travel along the follower travel path. In some embodiments, the identification of a travel path applies a minimal cost path algorithm to a graph representation of the voxels where vertices represent voxels, edges between vertices represent empty neighbor voxels, and the costs are associated with the edges. In some embodiments, the minimal cost path algorithm employs a Dijkstra algorithm. In some embodiments, the environmental costs are based on object locations of objects that the vehicles are to avoid. In some embodiments, the environmental costs associated with stationary vehicles are calculated prior to travel and the environmental costs associated with moving vehicles are calculated during travel. In some embodiments, the environmental costs are calculated based on environmental measures selected from a group consisting of a transform distance measure, an object density measure, and a zone permeability measure. In some embodiments, the relational costs are calculated based on relational measures selected from a group consisting of an easting separation measure, a northing separation measure, a height separation measure, a distance separation measure, an azimuth separation measure, and an elevation angle separation measure. In some embodiments, the relational costs are treated as random variables governed by probability density functions. In some embodiments, the instructions control the computing system to calculate the relational costs and identify the travel paths during travel of the swarm at time intervals. In some embodiments, each vehicle of the swarm includes a computer-readable storage medium and a processor and wherein the computer-executable instructions, when executed by the processor of a vehicle, identify a travel path for the vehicle during each time interval. In some embodiments, the instructions control the computing system to determine the leader travel path during each time interval. In some embodiments, the swarm is a leader swarm and a follower swarm of vehicles follows the leader swarm, and wherein a leader vehicle of the follower swarm follows a designated leader vehicle of the leader swarm.

In some embodiments, a computing system for identifying a travel path through a travel volume of voxels for a vehicle to travel from a current voxel to a target voxel is provided. The computing system comprises one or more computer-readable storage media storing computer-executable instructions and one or more processors that execute the computer-executable instructions stored in the computer-readable storage media. The instructions control the computing system to access indications of object voxels associated with objects that the vehicle is to avoid and empty voxels not associated with objects that the vehicle is to avoid. The instructions control the computing system to, for each empty voxel and each empty neighbor voxel of the empty voxel, calculate a cost of traveling from that empty voxel to that empty neighbor voxel. The instructions control the computing system to apply a minimal cost path algorithm to a cost graph to determine a travel path where vertices of the cost graph represent voxels, edges of the cost graph connect empty voxels of empty neighbor voxels, and the costs are associated with the edges. The instructions control the computing system to direct the vehicle to travel in the direction of the travel path. In some embodiments, the costs are based on a distance transform measure that is based on the distance from an empty voxel to the nearest object voxel. In some embodiments, the instructions control the computing system to, prior to travel, calculate stationary costs based on stationary objects and, during travel, calculate moving costs based on moving objects. The cost for traveling from an empty voxel to an empty neighbor voxel is the minimum of the stationary cost and the moving cost for the empty neighbor voxel. In some embodiments, the costs are based on environmental measures that include a transform distance measure, an object density measure, and a zone permeability measure.

In some embodiments, a method performed by a computing system for identifying a travel path for a follower vehicle to follow a leader vehicle through a travel volume of voxels is provided. The method calculates an environmental cost associated with traveling from each of a plurality of empty voxels to empty neighbor voxels. The method calculates a relational cost associated with traveling from the follower voxel to empty neighbor voxels. The method identifies a follower travel path for the follower vehicle based on the environmental cost and the relational cost. The method the follower vehicle to travel along the follower travel path. In some embodiments, the identification of the follower travel path applies a minimal cost path algorithm to a graph representation of the voxels where vertices represent voxels, edges between the vertices represent empty neighbor voxels, and the costs are associated with the edges. In some embodiments, the calculating of the environmental cost, the calculating of the relational cost, the identifying of the follower travel path, and the directing of the follower vehicle are performed at time intervals. In some embodiments, the relational cost is based on cost of the follower vehicle following the leader vehicle. In some embodiments, the environmental cost is based on cost of avoiding object voxels that contain an object.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, although the SPP system has been described primarily in the context of voxels that are cubes, the voxels may not be cubic. Also, rather than employing voxels, the vertices of a cost graph can represent arbitrary locations in space (referred to as reference locations) with edges indicating that travel between pairs of locations is permissible. In such a case, a leader location is the reference location closest to a leader vehicle, a follower location is the reference location closest to a follower vehicle, and a target location is the reference location closest to the target location. If voxels are employed, the center of the voxels can be considered to be reference locations. Accordingly, the invention is not limited except as by the appended claims.

The invention claimed is:

1. A method performed by a computing system for identifying, for a swarm of vehicles that includes a leader vehicle and a set of one or more follower vehicles, travel paths through a travel volume having empty locations and object locations, the method comprising:

for each pair of empty locations of the travel volume, calculating an environmental measure associated with traveling between the empty locations, the environmental measure being based on object locations near the pair of empty locations;

determining a leader travel path for the leader vehicle of the swarm to travel from a leader location to a target location based on the environmental measures;

for each pair of a follower location of a follower vehicle and an empty neighbor location, calculating a relational measure for the follower vehicle, wherein the relational measure is associated with traveling from the follower location to the empty neighbor location, the relational measure being based on maintaining a positional relationship with the leader vehicle based on the leader travel path;

for each follower vehicle of the set of one or more follower vehicles, identifying a follower travel path for the follower vehicle to follow the leader vehicle based on the environmental measures and the relational measures, wherein identifying the follower travel path includes applying a minimal cost path algorithm to a cost graph to determine a minimal cost path as the follower travel path, wherein vertices of the cost graph represent locations and edges between vertices represent that the locations of the vertices are neighbors, and wherein determining the minimal cost path as the follower travel path includes determining, for each of a plurality of edges of the cost graph, a cost associated with the edge as the greater of (i) an environmental cost associated with the edge or (ii) a relational cost associated with the edge, and wherein for each edge of the plurality of edges of the cost graph, the environmental cost associated with the edge is a function of a plurality of environmental probability density functions, each environmental probability density representing a different one of a plurality of environmental measures of the edge, and wherein for each edge of the plurality of edges of the cost graph, the relational cost associated with the edge is a function of a plurality of relational probability density functions, each relational probability density function representing a different one of a plurality of relational measures of the edge; and for at least one follower vehicle of the set of one or more follower vehicles, providing a corresponding identified follower travel path for the follower vehicle to a flight controller system to control a flight path of the follower vehicle.

2. The method of claim 1, wherein the swarm travels through a travel volume of voxels with each location being at a center of a voxel.

3. The method of claim 1, further comprising:
specifying as a leader travel direction the direction along the leader travel path; and
for each of the follower vehicles, specifying as a follower travel direction the direction along the follower travel path for that follower vehicle.

4. The method of claim 1, wherein the environmental measures are based on locations of objects that the vehicles are to avoid.

5. The method of claim 4, wherein the environmental measures associated with stationary vehicles are calculated prior to travel and the environmental measures associated with moving vehicles are calculated during travel.

6. The method of claim 1, wherein the environmental measures are selected from a set consisting of a distance transform measure, an object density measure, and a zone permeability measure.

7. The method of claim 1, wherein relational measures are selected from a set consisting of an easting separation measure, a northing separation measure, a height separation measure, a distance separation measure, an azimuth separation measure, and an elevation angle separation measure.

8. The method of claim 7, wherein calculation of the relational measures and determination of the travel paths are performed at regular time intervals during travel of the swarm.

9. The method of claim 8, wherein calculation of the environmental measures associated with moving objects is performed at regular time intervals during travel of the swarm.

10. The method of claim 8, wherein the regular time interval is adjusted based on risk tolerance of a vehicle colliding with an object.

11. The method of claim 8, wherein each vehicle of the swarm determines its travel path during each time interval.

12. The method of claim 11, wherein the leader vehicle of the swarm determines the leader travel path during each time interval.

13. The method of claim 12, wherein each follower vehicle calculates its relational costs during each time interval.

14. The method of claim 1, wherein some environmental cost measures are updated based on locations of objects that are within a specified remote distance of a current vehicle location.

15. The method of claim 14, wherein the remote distance is adjusted based on risk tolerance of a vehicle colliding with an object.

16. The method of claim 1, wherein the swarm is a leader swarm and a follower swarm of vehicles follows the leader swarm and wherein a leader vehicle of the follower swarm follows a designated vehicle in the leader swarm.

17. The method of claim 16, further comprising calculating relational measures for the leader vehicle of the follower swarm associated with traveling from a leader location of the follower swarm to a neighboring location, the relational measures based on the leader vehicle of the follower swarm following the travel path of a designated leader vehicle from the leader swarm.

18. The method of claim 1, further comprising directing each vehicle to travel in the direction of its travel direction.

19. A computing system for identifying, for a swarm of vehicles, travel paths through a travel volume of voxels, the computing system comprising:
  computer-readable storage media storing computer-executable instructions for controlling the computing system to:
    calculate environmental costs associated with traveling from each of a plurality of empty voxels to empty neighbor voxels;
    determine a leader travel path for a leader vehicle of the swarm based on environmental costs to travel from a leader voxel to a target voxel;
    direct the leader vehicle to travel along the leader travel path; and
    for each follower vehicle of the swarm,
      calculate relational costs associated with traveling from a follower voxel to empty neighbor voxels, the relational costs based on cost of following the leader travel path;
      identify a follower travel path for the follower vehicle based on the environmental costs and the relational costs; and
      direct the follower vehicle to travel along the follower travel path;
    wherein to identify the follower travel path includes to apply a minimal cost path algorithm to a cost graph to determine a minimal cost path as the follower travel path, wherein vertices of the cost graph represent locations and edges between vertices represent that the locations of the vertices are neighbors, and wherein to determine the minimal cost path as the follower travel path includes to determine, for each of a plurality of edges of the cost graph, a cost associated with the edge as the greater of (i) an environmental cost associated with the edge or (ii) a relational cost associated with the edge, and wherein for each edge of the plurality of edges of the cost graph, the environmental cost associated with the edge is a function of a plurality of environmental probability density functions, each environmental probability density representing a different one of a plurality of environmental measures of the edge, and wherein for each edge of the plurality of edges of the cost graph, the relational cost associated with the edge is a function of a plurality of relational probability density functions, each relational probability density function representing a different one of a plurality of relational measures of the edge and
  processors that execute the computer-executable instructions stored in the computer-readable storage media.

20. The computing system of claim 19, wherein the minimal cost path algorithm employs a Dijkstra algorithm.

21. The computing system of claim 19, wherein the environmental costs are based on object locations of objects that the vehicles are to avoid.

22. The computing system of claim 19, wherein the environmental costs associated with stationary vehicles are calculated prior to travel and the environmental costs associated with moving vehicles are calculated during travel.

23. The computing system of claim 19, wherein the environmental costs are calculated based on environmental measures selected from a group consisting of a transform distance measure, an object density measure, and a zone permeability measure.

24. The computing system of claim 19, wherein the relational costs are calculated based on relational measures selected from a group consisting of an easting separation measure, a northing separation measure, a height separation measure, a distance separation measure, an azimuth separation measure, and an elevation angle separation measure.

25. The computing system of claim 19, wherein the computer-executable instructions control the computing system to calculate the relational costs and identify the travel paths during travel of the swarm at time intervals.

26. The computing system of claim 25, wherein each vehicle of the swarm includes a computer-readable storage medium and a processor and wherein the computer-executable instructions, when executed by the processor of a vehicle, identify a travel path for the vehicle during each time interval.

27. The computing system of claim 26, wherein the computer-executable instructions, when executed by the processor of the leader vehicle and the follower vehicles of the swarm, determine the leader travel path during each time interval.

28. The computing system of claim 19, wherein the swarm is a leader swarm and a follower swarm of vehicles follows the leader swarm, and wherein a leader vehicle of the follower swarm follows a designated leader vehicle of the leader swarm.

29. A method performed by a computing system for identifying a travel path for a follower vehicle to follow a leader vehicle through a travel volume of voxels, the method comprising:
    calculating an environmental cost associated with traveling from each of a plurality of empty voxels to empty neighbor voxels;
    calculating a relational cost associated with traveling from a follower voxel in which the follower vehicle is currently located to empty neighbor voxels;
    identifying a follower travel path for the follower vehicle based on the environmental cost and the relational cost, wherein identifying the follower travel path includes applying a minimal cost path algorithm to a cost graph to determine a minimal cost path as the follower travel path, wherein vertices of the cost graph represent locations and edges between vertices represent that the locations of the vertices are neighbors, and wherein determining the minimal cost path as the follower travel path includes determining, for each of a plurality of edges of the cost graph, a cost associated with the edge as the greater of (i) an environmental cost associated with the edge or (ii) a relational cost associated with the edge, and wherein for each edge of the plurality of edges of the cost graph, the environmental cost associated with the edge is a function of a plurality of environmental probability density functions, each environmental probability density representing a different one of a plurality of environmental measures of the edge, and wherein for each edge of the plurality of edges of the cost graph, the relational cost associated with the edge is a function of a plurality of relational probability density functions, each relational probability density function representing a different one of a plurality of relational measures of the edge; and
    directing the follower vehicle to travel along the follower travel path.

30. The method of claim 29, wherein the calculating of the environmental cost, the calculating of the relational cost, the identifying of the follower travel path, and the directing of the follower vehicle are performed at time intervals.

31. The method of claim 29, wherein the relational cost is based on cost of the follower vehicle following the leader vehicle.

32. The method of claim 29, wherein the environmental cost is based on cost of avoiding object voxels that contain an object.

\* \* \* \* \*